United States Patent
Takahata et al.

(10) Patent No.: US 6,249,093 B1
(45) Date of Patent: Jun. 19, 2001

(54) DRIVE MECHANISM EMPLOYING ELECTROMECHANICAL TRANSDUCER, PHOTOGRAPHING LENS WITH THE DRIVE MECHANISM, AND ITS DRIVE CIRCUIT

(75) Inventors: Junji Takahata; Koutaro Kawabe, both of Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/326,875

(22) Filed: Jun. 7, 1999

(30) Foreign Application Priority Data

Jun. 8, 1998 (JP) .................................................. 10-159206
Jun. 9, 1998 (JP) .................................................. 10-160448

(51) Int. Cl.[7] .............................. H01L 41/08; H02N 2/00
(52) U.S. Cl. ...................... 318/129; 310/328; 310/323.02
(58) Field of Search ..................................... 318/118, 119, 318/122, 123, 126, 129, 135; 310/316, 317, 323.02, 328

(56) References Cited

U.S. PATENT DOCUMENTS 4,689,514 * 8/1987 Kondoh et al. ....................... 310/316
5,589,723 12/1996 Yoshida et al. ....................... 310/328

FOREIGN PATENT DOCUMENTS 59-26709 2/1984 (JP) .
9-191676 7/1997 (JP) .

\* cited by examiner

*Primary Examiner*—Nestor Ramirez
*Assistant Examiner*—Judson H. Jones
(74) *Attorney, Agent, or Firm*—Sidley & Austin

(57) ABSTRACT

A driving apparatus, employing a piezoelectric element, for smoothly and silently driving a focus lens of a camera over a wide range of its driving speed. The driving apparatus includes a control system for controlling the piezoelectric element in such a manner that a continuous supply of a certain number of drive pulses to the piezoelectric element and a non-supply thereof during a certain period of time are repeated by a "block pulse drive" at time of slow speed driving, and that the continuous supply thereof are continuously supplied to the piezoelectric element by a "continuous pulse drive" at time of high speed driving.

16 Claims, 20 Drawing Sheets

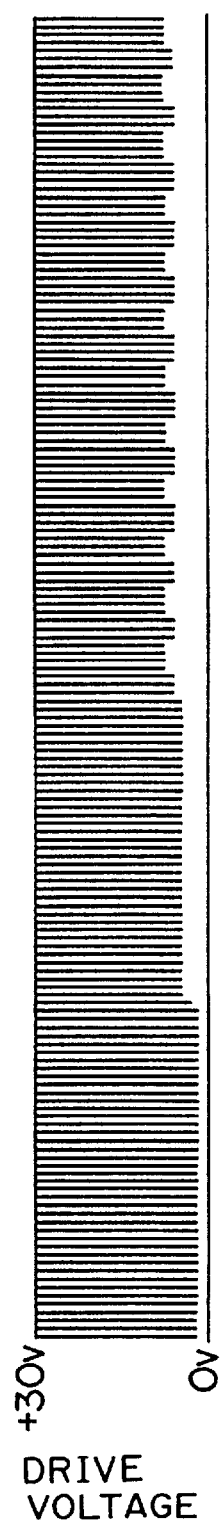
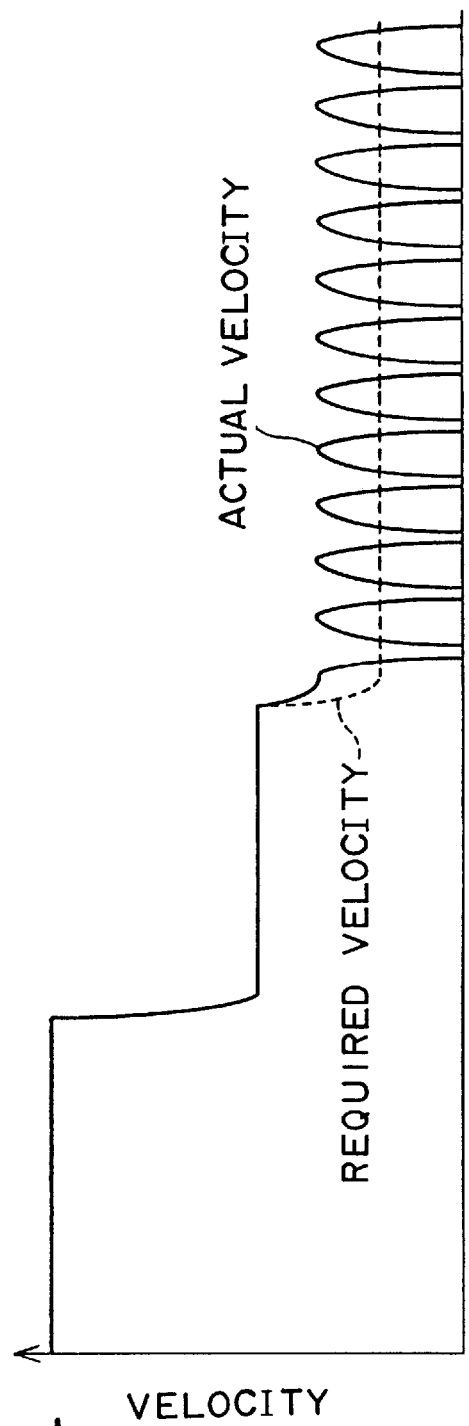
Fig. 3A PRIOR ART
Fig. 3B PRIOR ART

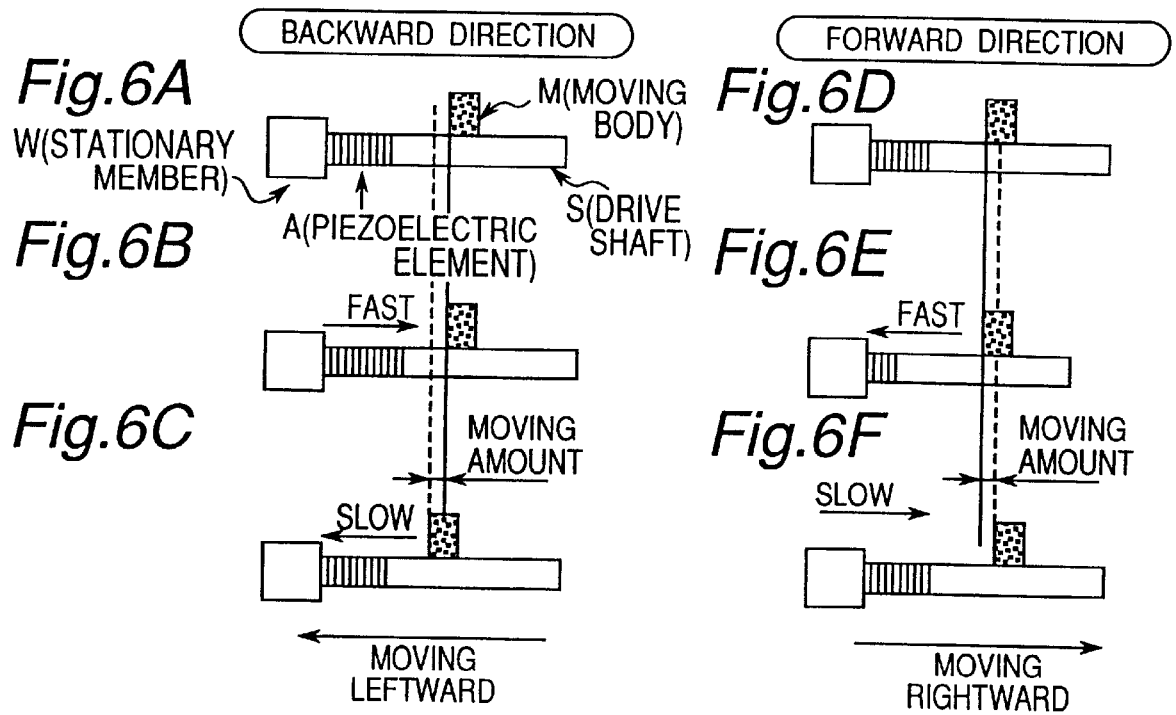
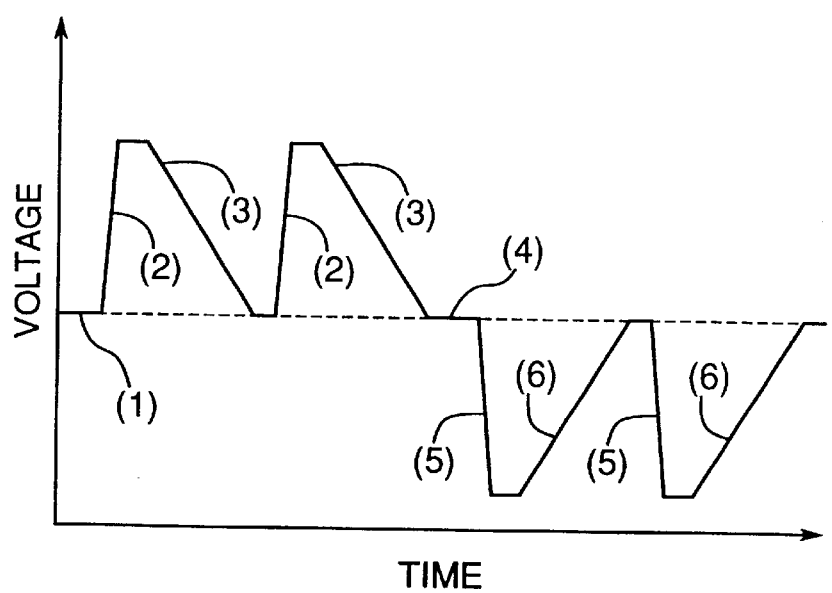

DRIVE MECHANISM EMPLOYING ELECTROMECHANICAL TRANSDUCER, PHOTOGRAPHING LENS WITH THE DRIVE MECHANISM, AND ITS DRIVE CIRCUIT

This application is based upon application Nos. 10-159206 and 10-160448 filed in Japan, the contents of which are hereby incorporated by reference.

BACKGROUND OF THE INVENTION

1. Field of the Invention

The present invention relates to a drive mechanism which employs an electromechanical transducer, a photographing lens having the drive mechanism, and a drive circuit for driving the drive mechanism.

2. Description of the Related Arts

Conventionally, there have been proposed a variety of actuators, each of which employs a piezoelectric element as an electromechanical transducer. For example, the piezoelectric element of an actuator, which constitutes a part of a photographing lens, of a camera in which the actuator is employed for executing a focusing operation (i.e. for driving a focus lens) of the photographing lens, is supplied with a drive pulse with a frequency that is higher than a frequency that corresponds to an upper limit of audibility. With the supply of such a drive pulse to the piezoelectric element, a reduction in mechanical noise which is generated from the actuator upon executing the focusing operation, is realized.

When the focusing operation is executed under a focusing drive control, a focus lens, which is included in the photographing lens, is not driven at a constant speed or velocity.

For example, if the focusing drive control is an "AF" control for auto-focusing, the speed of the focus lens is reduced as the focus lens approaches a desired target location, so that the focus lens is prevented from passing beyond the desired target location.

On the other, hand if the focusing drive control is a "PF" control for manual-focusing which is executed in the case that the photographing lens is a power focusing lens (namely, "PF" lens), the focus lens is driven by the actuator at a speed, or velocity, in accordance with an amount of operation (or operation speed) of a focus ring, of the photographing lens, which is operated by a photographer. The "PF" control is a power focus control which generally means the focus control to control a manual focus lens- which is driven by a driving source, such as a motor, for performing its focusing operation.

Generally, a maximum drive speed, or velocity, of the focus lens, depends on capability, or performance, of the actuator. In order to drive the focus lens at a desired speed or velocity, it has been conventionally practiced to execute a feedback control for adjusting a drive voltage which is supplied to the actuator. Namely, the drive voltage is being adjusted while an amount of movement, or displacement, of the focus lens is being monitored.

The feedback control, however, has a problem as follows. Namely, when the focus lens approaches the desired target location under the "AF" control, there is a possibility that a low-velocity driving of the focus lens is not realized.

On the other hand, the operation speed of the focus ring is small under the "PF" control, and there is the same possibility that a low-velocity driving of the focus lens is not realized.

This problem is caused by a variation in characteristic of speed, or velocity, of the actuator for driving the focus lens, and is caused by a limit of controllability of the feedback system.

More specifically, for example, as shown in FIG. 1 which denotes a characteristic between a drive voltage of the actuator and the speed, or velocity, thereof, the characteristic therebetween varies depending upon, for example, an error in assemblage of the individual actuator. In FIG. 1, a curve "a" is generally linear in relation between the drive voltage and the velocity.

However, a curve a "b" and a curve "c" are generally non-linear in relation therebetween, respectively. Namely, each of the curve "b" and "c" indicates that the actuator is not driven until the drive voltage is increased up to a certain level of voltage.

Furthermore, each of the curve "b " and "c" indicates that the actuator suddenly, or abruptly, speeds up once it starts moving.

As can be seen from FIG. 1, the performance, or characteristic, of the individual actuator varies on a basis of its individual peculiarity thereof, even if the same drive voltage is applied to it. In particular, in the case that an inclination of a curve, as illustrated by the curve "c", is steeper at a low velocity, the speed of the actuator changes more greatly even if the drive voltage applied thereto changes a little. This means that it is very difficult to smoothly control the drive, or operation, of the actuator by the feedback control at the time of driving the actuator at such a lower velocity.

FIGS. 2A and 2B show an example of controlling the actuators having characteristics denoted by the curves "a", "b" and "c" of FIG. 1. In this example, a drive pulse is continuously supplied to the actuator so as to control the drive of the actuator. Namely, as shown in the figures, the amplitude of the drive voltage supplied thereto is reduced step by step, so that the velocity of the actuator is gradually reduced for the purpose of preventing the focus lens, driven by the actuator, from overrunning its target location.

In case that the actuators having characteristics denoted by the curves "a", "b" and "c" of FIG. 1 are controlled in the same way with the same drive voltage shown in. FIG. 2A, each of the actuators having characteristics denoted by the curves "b" and "c" stops before it reaches its target location as the amplitude of the drive voltage becomes smaller, as shown in FIG. 2B.

Meanwhile, FIGS. 3A and 3B show an example of controlling the actuator, having the characteristic denoted by the curve "c" of FIG. 1, under the conventional "AF" control. In this example, the control of velocity of the focus lens is executed only by the feedback of the drive voltage supplied thereto, as shown in the figures. As explained above, the velocity of the actuator having the characteristic denoted by the curve "c" of FIG. 1 changes greatly, in case that the drive voltage is at a lower level, and in case that there is a slight change in the drive voltage. Therefore, in case that the drive voltage is supplied to the actuator, under the feedback control, so as to realize a lower required velocity (see "REQUIRED VELOCITY") denoted by a chain line in FIG. 3B, the actuator repeatedly moves and stops as shown by a solid line in the same figure, depending upon a fluctuation of the drive voltage under the feedback control. In other words, the movement of the actuator lacks smoothness; therefore, such an awkward movement of the actuator may give a user (i.e. a photographer) a feeling of unpleasantness.

That is, as explained above, in case that there exists a variation in characteristic between the drive voltage applied to the actuator and the velocity thereof (namely, in case that the characteristic is not generally linear therebetween), it may not possible to realize a desired target velocity of the actuator and/or the actuator may suddenly stops even if controlling the drive voltage by executing the feedback operation.

In order to control the actuators having such characteristics with a higher accuracy at a lower speed, it is necessary to increase its positional detection accuracy and/or to shorten its sampling cycle of the positional detection. For example, if the positional detection accuracy is 1 μm, and if the sampling cycle of the positional detection is 1 ms, then its controllable limit velocity is 1 μm/1 ms=1mm/s. If a required velocity is 0.1 mm/s, then it is necessary to further increase the positional detection accuracy and/or to further shorten the sampling cycle of the positional detection.

However, it is very difficult to further increase the positional detection accuracy, because its countermeasure to realize the higher positional detection accuracy is accompanied with some technical problem. Also, it is very difficult to further shorten the sampling cycle of the positional detection, because the processor, which executes an operation to detect the position, can not help but require some time for the operation.

In order to realize the drive of the actuator at the lower velocity, it is possible to use such a simplest mechanism as employing a drive pulse having a lower frequency. However, if the frequency is lowered up to a zone, or range, of frequency which corresponds to audibility, a noise of mechanical vibration caused by the drive pulse is emitted. This noise spoils a feature, which is a silent working and operation, of this actuator.

SUMMARY OF THE INVENTION

Accordingly, it is an object of the present invention to provide a drive mechanism employing an electromechanical transducer in which the drive mechanism realizes a smooth drive at a lower velocity while maintaining the feature of silent working and operation, to provide a photographing lens having the drive mechanism, and to provide its drive circuit.

It is another object of the present invention to provide the drive mechanism which realizes the smooth drive over a wide range from the lower velocity up to a higher velocity, to provide the photographing lens having the drive mechanism, and to provide its drive circuit.

In accomplishing these and other objects of the present invention, according to one aspect of the present invention, there is provided a drive mechanism, comprising: an electromechanical transducer; a pulse supplier for providing an electrical charge and inducing discharge of the electrical charge relative to the electromechanical transducer, wherein the pulse supplier supplies a drive pulse to the electromechanical transducer, so that the electromechanical transducer expands and contracts with mutually different velocities, and so that a moving body driven by the electromechanical transducer is moved in a predetermined direction; and a controller which has a first mode for controlling the pulse supplier so that a pulse supply in which a specified number of pulses of the drive pulse are continuously supplied from the pulse supplier to the electromechanical transducer, and a pulse non-supply in which the drive pulse is not supplied from the pulse supplier to the electromechanical transducer during a specified time, are alternately repeated.

In the construction, the drive pulse is continuously supplied to the electromechanical transducer from the pulse supplier, until the number of the pulses reaches the specified number thereof (hereinafter, referred to as "consecutive pulse number"). With this pulse supply, the electromechanical transducer (therefore, an object which is driven by the moving body) is driven. Next, the supply of the drive pulse to the electromechanical transducer is stopped during the specified time. With the pulse non-supply, the drive of the electromechanical transducer (therefore, the object) is stopped during the specified time. The pulse supply and the pulse non-supply, as one cycle, is repeated so as to drive and not to drive the electromechanical transducer alternately. As a result, it is possible to make the average drive velocity of the moving body relatively smaller per unit time. By employing the drive pulse with a frequency higher than a frequency of audibility, and by properly selecting the consecutive pulse number, the pulse stopping time during which the supply of the drive pulse is stopped to the electromechanical transducer, and the amplitude of the drive pulse, the moving body (therefore, the object driven by the moving body) is smoothly moved in the desired direction.

Namely, with the drive mechanism, a smooth drive of the moving body and the object driven thereby at a lower velocity while maintaining the feature of silent working and operation, is surely realized.

Preferably, the controller determines a target velocity of the moving body, and wherein the controller changes the specified time during which the drive pulse is not supplied from the pulse supplier to the electromechanical transducer, on a basis of the target velocity thus determined.

According to the construction, if the specified time becomes relatively shorter, the average velocity of the moving body becomes relatively higher. On the other hand, if the specified time becomes relatively longer, the average velocity becomes relatively lower. Therefore, in compliance with the target velocity, the specified time (i.e. the pulse stopping time) can be changed so as to make the average velocity of the moving body coincident with the target velocity.

Preferably, the controller changes the specified number of pulses of the drive pulse on a basis of the target velocity.

Preferably, there is further provided a detector for detecting a movement amount of the moving body, wherein the controller changes the specified number (or consecutive pulse number) of pulses of the drive pulse on a basis of the detected movement amount, so that the movement amount, corresponding to one cycle defined by the pulse supply and the pulse non-supply, of the moving body is adjusted to a specified amount.

According to the construction, if the consecutive pulse number increases, the movement amount of the moving body increase per cycle defined by the pulse supply and the pulse non-supply. On the other hand, if the consecutive pulse number decreases, the movement amount of the moving body decrease per cycle defined thereby. Therefore, in compliance with the movement amount detected by the detector, the consecutive pulse number can be changed so as to make the average velocity of the moving body coincident with the specified amount.

Preferably, the controller changes the specified time during which the drive pulse is not supplied to the electromechanical transducer, on the basis of the movement amount detected by the detector.

According to the construction, if the specified time becomes shorter, the average velocity of the moving body becomes higher. On the other hand, if the specified time becomes longer, the average velocity of the moving body becomes lower. Therefore, a suitable combination of the pulse stopping time and the consecutive pulse number can realize an effective control over the driving velocity of the moving body, in compliance with the target velocity.

Preferably, the controller determines the target velocity of the moving body so that the target velocity decreases step by step, as the moving body approaches a target stop position.

According to the construction, because the target velocity decreases as the moving body approaches the target stop position, it is possible to make the moving body stop at the target stop position more accurately.

The aforementioned drive mechanism, for example, can be preferably used for driving a focus lens in an auto-focus photographing, in which the drive mechanism realizes a positioning of the focus lens with a higher precision.

Preferably, the controller makes the target velocity of the moving body correspond to an operation velocity of an operation member.

According to the arrangement, it is possible that the moving body is driven quickly, for example, when the operation member is manipulated quickly, and that the moving body is driven slowly, for example, when the operation member is manipulated slowly. Namely, with the arrangement, the mechanical and electronic operation of the drive mechanism can be made to be interlocked with its user's manual operation, as if the user directly drives the moving body of the drive mechanism, which gives the user a natural feeling of operation and which does not give the user a feeling of incongruity in handing.

This drive mechanism, for example, can be preferably used for driving a focus lens in a power-focus photographing lens in compliance with the operation velocity of the operation member such as a focus ring.

Preferably, the controller further has a second mode for controlling the pulse supplier so that the pulses of the drive pulse are continuously supplied from the pulse supplier to the electromechanical transducer, wherein the controller selects one of the first mode and the second mode.

According to the construction, the second mode can be preferably used for driving the moving body at a higher velocity.

Also, according to the construction, because the controller controls to have one of the first mode and the second mode selectively, the most suitable mode is selected on a basis of the target velocity.

As described above, at time of focusing, it is necessary to suitably and smoothly control the drive of the focus lens over a relatively wide range from the lower velocity up to a higher velocity. According to the aforementioned construction, the suitable and smooth drive of the moving body is surely realized, over a wide range of velocity.

Preferably, the controller sets a reference velocity for switching between the first mode and the second mode, on a basis of which one of the first mode and the second mode the controller has selected.

According to the construction, for example, by separating the reference velocity for switching from the first mode to the second mode and the reference velocity for switching from the second mode to the first mode from each other, a frequent switching between the first mode and the second mode with a shorter cycle is prevented. Namely, with this arrangement, the moving body is stably driven by the electromechanical transducer, and any loss which may be caused at time of switching between the first mode and the second mode, can be effectively avoided; thus, the efficiency for driving the moving body is surely enhanced.

Preferably, the controller determines a target velocity of the moving body, wherein the controller selects the second mode when the target velocity is relatively higher, and the controller selects the first mode when the target velocity is relatively lower.

According to another aspect of the present invention, there is provided an auto-focus photographing lens with a drive mechanism, the drive mechanism comprising: an electromechanical transducer; a pulse generator for providing an electrical charge and inducing discharge of the electrical charge relative to the electromechanical transducer, wherein the pulse generator supplies a drive pulse to the electromechanical transducer, so that the electromechanical transducer expands and contracts with mutually different velocities, and so that a moving body driven by the electromechanical transducer is moved in a predetermined direction; and a controller which has a first mode for controlling the pulse generator so that a pulse supply in which a specified number of pulses of the drive pulse are continuously supplied from the pulse generator to the electromechanical transducer, and a pulse non-supply in which the drive pulse is not supplied from the pulse generator to the electromechanical transducer during a specified time, are alternately repeated, wherein the moving body moves a focus lens.

In the construction, the controller further can have a second mode for controlling the pulse generator so that the pulses of the drive pulse are continuously supplied to the electromechanical transducer, wherein the controller selects one of the first mode and the second mode.

According to still another aspect of the present invention, there is provided a power-focus photographing lens with a drive mechanism, the drive mechanism comprising: an electromechanical transducer; a pulse supplier for providing an electrical charge and inducing discharge of the electrical charge relative to the electromechanical transducer, wherein the pulse supplier supplies a drive pulse to the electromechanical transducer, so that the electromechanical transducer expands and contracts with mutually different velocities, and so that a moving body driven by the electromechanical transducer is moved in a predetermined direction; and a controller which has a first mode for controlling the pulse supplier so that a pulse supply in which a specified number of pulses of the drive pulse are continuously supplied from the pulse supplier to the electromechanical transducer, and a pulse non-supply in which the drive pulse is not supplied from the pulse supplier to the electromechanical transducer during a specified time, are alternately repeated, wherein the controller determines a target velocity of the moving body, in which the controller changes the specified time during which the drive pulse is not supplied from the pulse supplier to the electromechanical transducer, on a basis of the target velocity thus determined, wherein the controller makes the target velocity of the moving body correspond to an operation velocity of an operation member, wherein the moving body moves a focus lens, and wherein the operation member is a member for adjusting a focus of the focus lens.

In the construction, the controller further can have a second mode for controlling the pulse supplier so that the pulses of the drive pulse are continuously supplied to the electromechanical transducer, wherein the controller selects one of the first mode and the second mode.

According to still another aspect of the present invention, there is provided a drive circuit which is employed with a drive mechanism, the drive mechanism, comprising: an electromechanical transducer; and a pulse supply section for providing an electrical charge and inducing discharge of the electrical charge relative to the electromechanical transducer, wherein the pulse supply section supplies a drive pulse to the electromechanical transducer, so that the electromechanical transducer expands and contracts with mutually different velocities, and so that a moving body driven by the electromechanical transducer is moved in a predetermined direction, wherein the drive circuit has a control section having a first mode for controlling the pulse supply section so that a pulse supply in which a specified number of pulses of the drive pulse are continuously supplied from the pulse supply section to the electromechanical transducer, and a pulse non-supply in which the drive pulse is not supplied from the pulse supply section to the electromechanical transducer during a specified time, are alternately repeated.

In the construction, the control section further can have a second mode for controlling the pulse supply section so that the pulses of the drive pulse are continuously supplied from the pulse supply section to the electromechanical transducer, wherein the controller selects one of the first mode and the second mode.

BRIEF DESCRIPTION OF THE DRAWINGS

These and other objects and features of the present invention will become clear from the following description taken in conjunction with preferred embodiments thereof with reference to the accompanying drawings, in which:

FIGS. 3A and 3B show a graph which indicates the relation between the drive voltage and the velocity in case that the actuator with the characteristic "c" shown in FIG. 1 is driven under an "PF" control;

FIGS. 6A through 6F are explanatory views showing a principle of how the actuator of the focus drive mechanism of FIG. 4 is driven or actuated;

FIG. 7 is a graph showing a relation between a voltage and a time, relating to a drive pulse which is used for driving the piezoelectric element of FIG. 4;

DETAILED DESCRIPTION OF THE PREFERRED EMBODIMENTS

Figure 1:
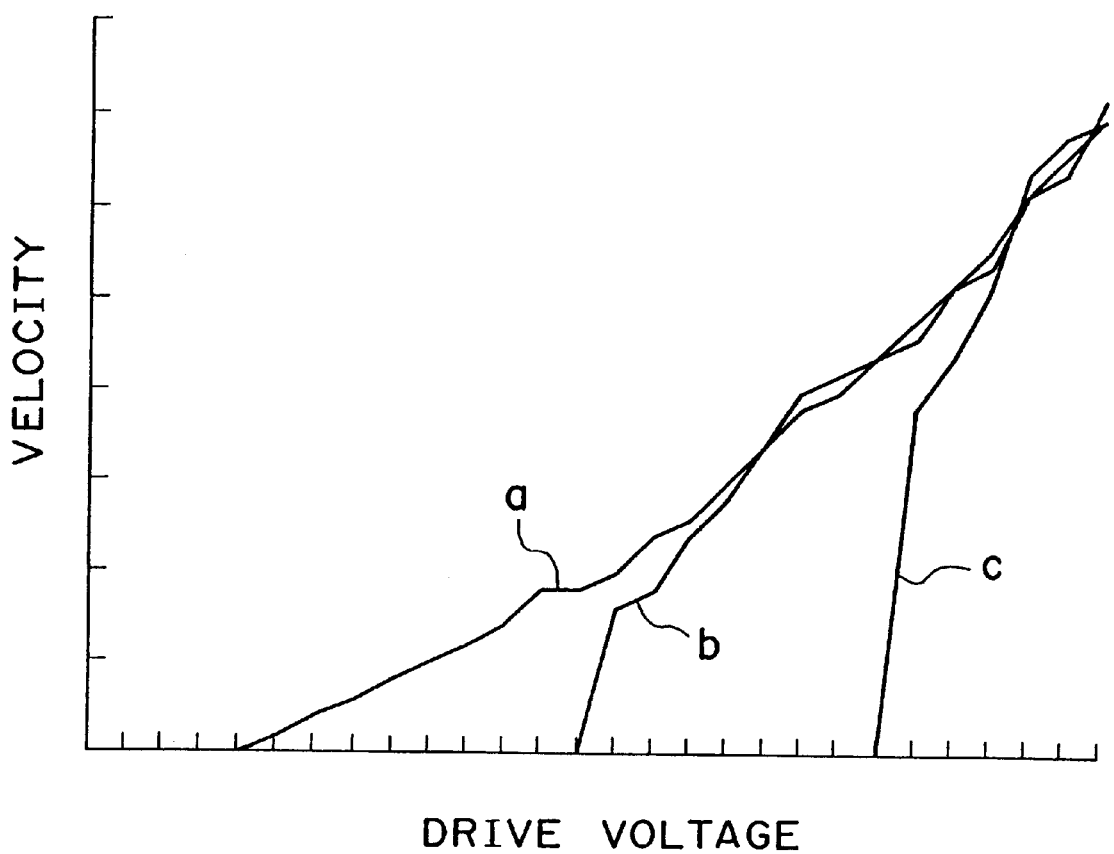
FIG. 1 is a graph showing a relation between a drive voltage and a velocity, relating to an actuator of a drive mechanism of a camera according to a prior art.
Figures 2A, 2B:
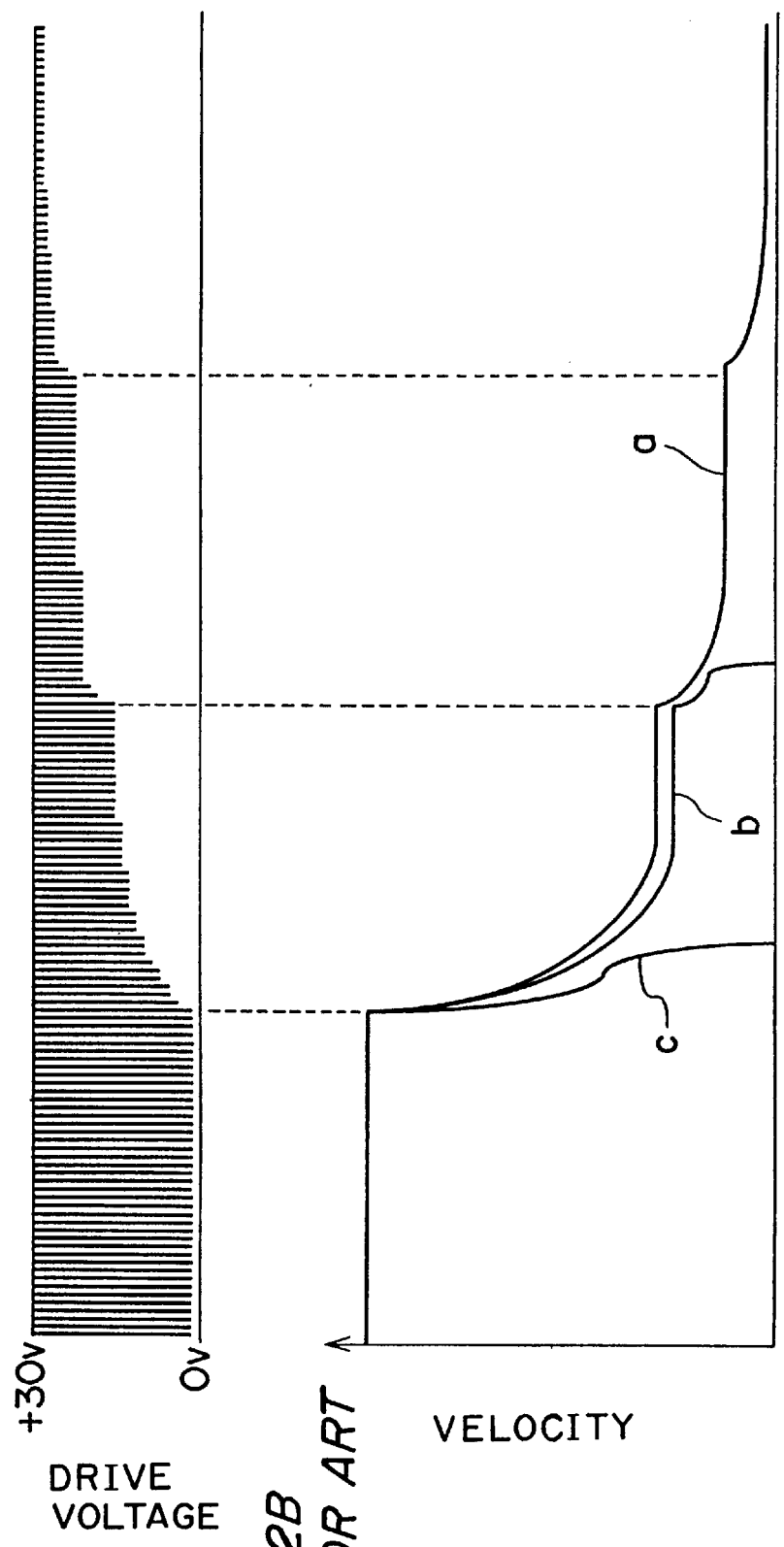
FIGS. 2A and 2B show a graph corresponding to the graph of FIG. 1, showing the relation between the drive voltage and the velocity in case that the actuator with a characteristic or performance, shown in FIG. 1, is driven under an "AF" control.

Before a description of each of preferred embodiments of the present invention proceeds, it is to be noted that like or corresponding parts are designated by like reference numerals throughout the accompanying drawings.

Referring to FIGS. 4 through 28, the description is made below in detail upon a focus drive mechanism, employing an electromechanical transducer, of a photographing lens of a camera, according to each of a first embodiment and a second embodiment of the present invention.

Firstly, referring to FIGS. 4 through 27, the description is made below upon the focus drive mechanism, employing the electromechanical transducer, of the photographing lens of the camera, according to the first embodiment.

Figure 4:
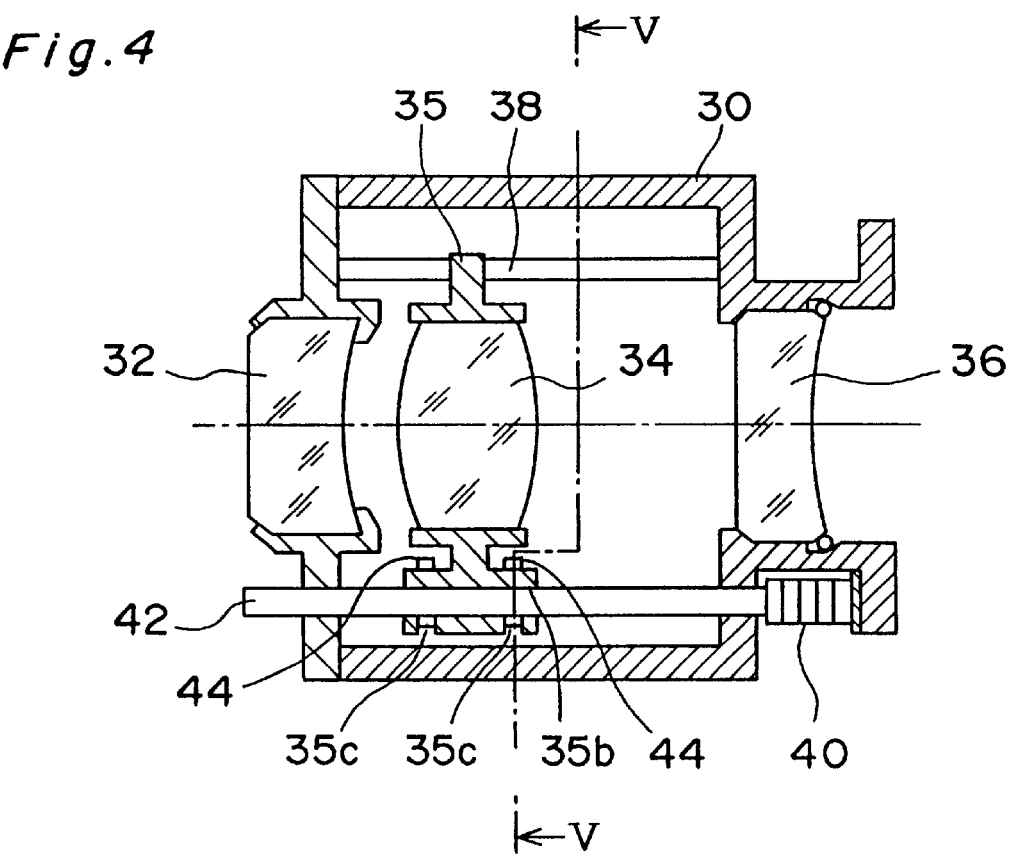
FIG. 4 is a sectional view showing a main part of a photographing lens, including an actuator employing a piezoelectric element of a focus drive mechanism, of a camera, according to a first embodiment and a second embodiment of the present invention.
Figure 5:
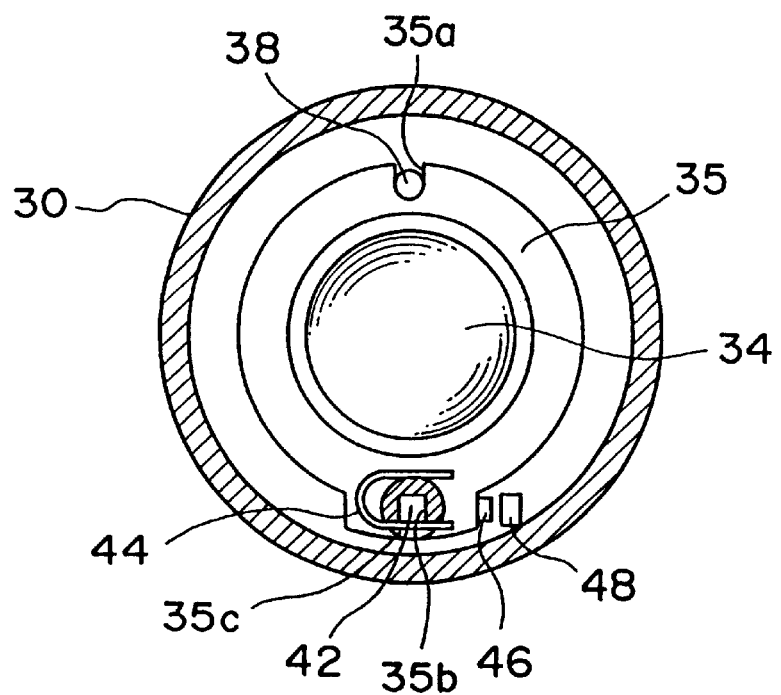
FIG. 5 is a sectional view taken along a line V—V of FIG. 4.

FIG. 4 is a schematic cross sectional view of the photographing lens having the focus drive mechanism, and FIG. 5 is a sectional view taken along a line V—V of FIG. 4. As shown in the figures, the photographing lens of the camera has an outer cylinder 30. Inside the outer cylinder 30, a first lens 32 and a third lens 36 are mounted so that each of the first lens 32 and the third lens 36 is fixed with respect to the outer cylinder 30, respectively. Inside the outer cylinder 30, there is also mounted a second lens 34 between the first lens 32 and the third lens 36, where a lens frame 35 for holding the second lens 34 is slidably mounted on a guide rod 38 which extends in a direction of an optical axis. The second lens 34 is a focus lens which is driven by an actuator, employing a piezoelectric element 40 as an electromechanical transducer, that forms a part of the focus drive mechanism.

The guide rod 38 is mounted stationary relative to the outer cylinder 30 in the direction of the optical axis. Inside the outer cylinder 30, there is also mounted a drive rod 42 which is supported movably relative to the outer cylinder 30 in the direction of the optical axis, and which can drive the lens frame 35 of the second lens 34 in the direction of optical axis, by the actuator employing the piezoelectric element 40.

In more detail, the lens frame 35 of the second lens 34 has an engagement groove 35a on its upper portion, and the guide rod 38 engages with the engagement groove 35a. With the construction, the lens frame 35 is prevented from rotating about the drive rod 42. The lens frame 35 of the second lens 34 has on its lower portion a through hole 35b inside which the drive rod 42 extends, and has a pair of cutout grooves 35c, 35c each of which reaches the through hole 35b. A U-shaped pressure spring 44 is fit inside each of the cutout grooves 35c, 35c, by which construction the drive rod 42 and the lens frame 35 are frictionally contacted with each other under an appropriate frictional force exerting therebetween.

Each of the piezoelectric element 40 and the drive rod 42 has a pair of ends in the direction of the optical axis. One end of the pair of ends of the piezoelectric element 40 is fixed to the outer cylinder 30, and the other end thereof of the piezoelectric element 40 is fixed to one end of the drive rod 42. In the arrangement, the direction of the-optical axis is coincident with a direction in which the piezoelectric element 40 expands and contracts (or shrinks).

The position of the lens frame 35 is detected by an MR sensor (i.e. Magneto-Resistive element type of positional sensor which is constituted by a film-like ferromagnetic body).

That is, as shown in FIG. 5, a magnetized rod 48 is fixed inside the outer cylinder 30 so that the magnetized rod 48 is arranged along the drive rod 42. Further, a magneto-resistive element 46 is fixed to a lower portion of the lens frame 35 so that the magneto-resistive element 46 faces the magnetized rod 48. The magnetized rod 48 is magnetized with a plurality of pairs of north and south poles which are arranged at regular intervals in a direction in which the lens frame 35 moves.

In the construction, when the magneto-resistive element 46 moves relative to the magnetized rod 48, the value of resistance of the magneto-resistive element 46 changes in response to its movement. Namely, with this construction, the distance of movement of the lens frame 35 relative to the magnetized rod 48 is detected; in other words, the position of the lens frame 35 relative to the outer cylinder 30 is detected.

The piezoelectric element 40 extends and contracts when a drive pulse is supplied thereto, thereby moving the drive rod 42 in the direction of the optical axis, as described later. When the drive rod 42 is reciprocated, or vibrated, in the direction of the optical axis so that a velocity of the drive rod 42 relative to the outer cylinder 30 in one direction along the optical axis is different from a velocity thereof in the opposite direction therealong by supplying the drive pulse having a saw-teeth-shaped waveform to the piezoelectric element 40 for example, the lens frame 35 (therefore, the second lens 34) which is frictionally contacted with the drive rod 42, can be driven in either one of the one direction and the opposite direction along the optical axis.

Next, it is explained about a principle of operation of the actuator employing the piezoelectric element 40 which extends and contracts (or shrinks) in the direction of the optical axis.

FIGS. 6A through 6F explanatorily show the principle, as a model, of operation of the actuator. Namely, the actuator has a stationary member "W" which is fixed to an unshown base; a piezoelectric element "A" having a pair of ends in a direction in which the piezoelectric element "A" expands and contracts where one end of the pair of ends is fixed to the stationary member "W"; a drive shaft "S" having a pair of ends in the same direction in which the piezoelectric element "A" expands and contracts where the drive shaft "S" is movably supported in the same direction on the base, or on the stationary member "W", and where one end of the pair of ends of the drive shaft "S" is fixed to the other end of the piezoelectric element "A"; and a moving body "M" which is frictionally connected to the drive shaft "S".

For example, if a pulse voltage having a generally saw-teeth-shaped waveform as shown in FIG. 7 is applied to the piezoelectric element "A", the other end of the piezoelectric element "A" expands rapidly relative to the one end thereof in one direction, and the other end of the piezoelectric element "A" contracts slowly relative to the one end thereof in the opposite direction. Consequently, when the piezoelectric element "A" vibrates in this manner, the drive shaft "S" is moved rapidly in the one direction and is moved slowly in the opposite direction; as a result, the moving body "M" is driven along the drive shaft "S", as follows.

Namely, referring to FIGS. 6A through 6F, and to FIG. 7, if the pulse voltage applied to the piezoelectric element "A" is suddenly raised as indicated by (2) in FIG. 7 from a reference voltage as indicated by (1) in the same figure to its maximum voltage, then the piezoelectric element "A" suddenly extends from a reference state shown in FIG. 6A to a state shown in FIG. 6B (that is, the drive shaft "S" rapidly moves away from the stationary member "W"). In this stage, the acceleration of the drive shaft "S" is relatively greater. Therefore, the inertial force of the moving body "M" becomes relatively greater than the frictional force exerting between the moving body "M" and the drive shaft "S". Consequently, the drive shaft "S" moves relative to the stationary member "M" while the moving body "N" substantially remains unmoved relative thereto.

Next, if the pulse voltage applied to the piezoelectric element "A" is gradually reduced from the maximum voltage to the reference voltage as indicated by (3) in FIG. 7, then the drive shaft "S" moves slowly from the state shown in FIG. 6B to a state shown in FIG. 6C. In this stage, the acceleration of the drive shaft "S" is relatively smaller. Therefore, the inertial force of the moving body "M" is also relatively smaller. Consequently, the moving body "M" moves, relative to the stationary member "M", together with the drive shaft "S" by the frictional force exerting between the moving body "M" and the drive shaft "S".

If the aforementioned pulse voltage having the generally saw-teeth-shaped waveform is continuously applied to the piezoelectric element "A", then the moving body "M" is driven to move in the backward direction (i.e. in leftward direction in FIGS. 6A through 6C).

On the other hand, when the moving body "M" is made to move in the forward direction (i.e. in rightward direction in FIGS. 6D through 6F), a pulse voltage inverse to the aforementioned pulse voltage is applied to the piezoelectric element "A".

Namely, if the pulse voltage applied to the piezoelectric element "A" is suddenly dropped down as indicated by (5)

in FIG. 7 from the reference voltage as indicated by (4) in the same figure to its minimum voltage, then the piezoelectric element "A" suddenly contracts, or shrinks, from a reference state shown in FIG. 6D to a state shown in FIG. 6E (that is, the drive shaft "S" rapidly moves towards the stationary member "W"). In this stage, the acceleration of the drive shaft "S" is relatively greater. Therefore, the inertial force of the moving body "M" becomes relatively greater than the frictional force exerting between the moving body "M" and the drive shaft "S". Consequently, the drive shaft "S" moves relative to the stationary member "M" while the moving body "M" substantially remains unmoved relative thereto.

Next, if the pulse voltage applied to the piezoelectric element "A" is gradually reduced from the minimum voltage to the reference voltage as indicated by (6) in FIG. 7, then the drive shaft "S" moves slowly from the state shown in FIG. 6E to a state shown in FIG. 6F. In this stage, the acceleration of the drive shaft "S" is relatively smaller. Therefore, the inertial force of the moving body "M" is also relatively smaller. Consequently, the moving body "M" moves, relative to the stationary member "M", together with the drive shaft "S" by the frictional force exerting between the moving body "M" and the drive shaft "S".

If the pulse voltage having the generally saw-teeth-shaped waveform is continuously applied to the piezoelectric element "A", then the moving body "M" is driven to move in the forward direction, as shown in FIGS. 6D through 6F.

Figure 8:
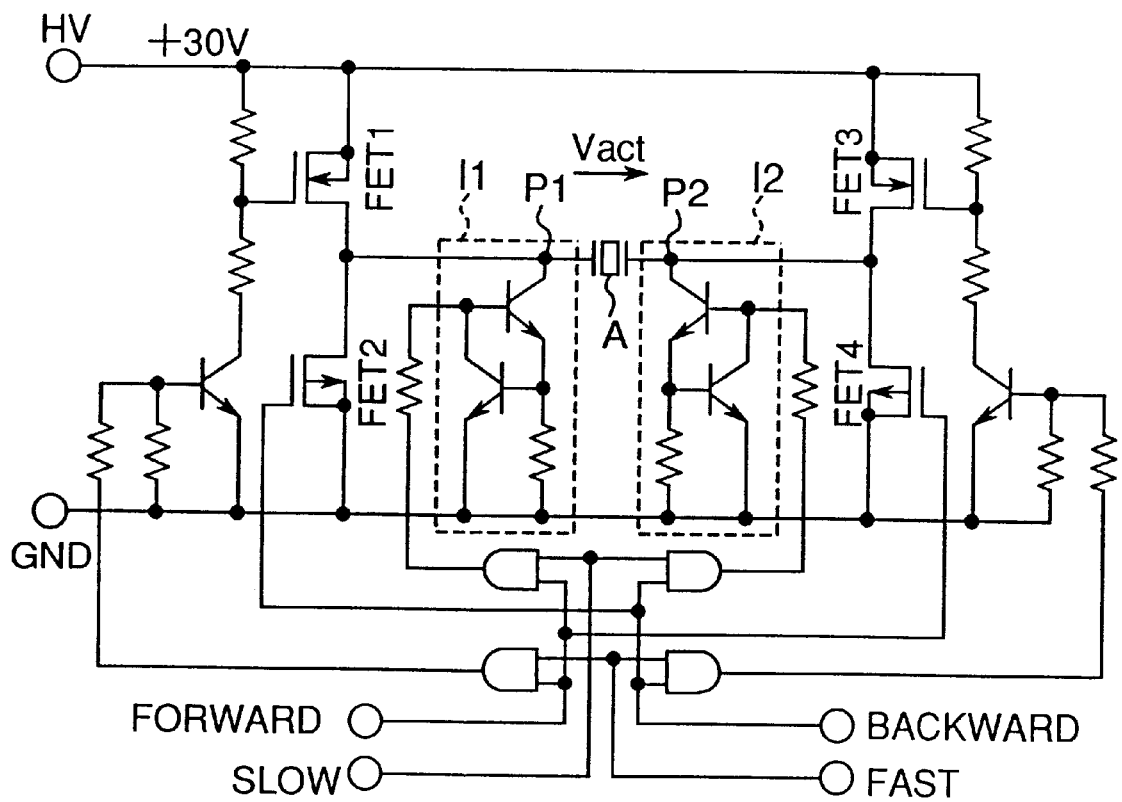
FIG. 8 is a diagram of a drive circuit of the focus drive mechanism for driving the piezoelectric element of FIG. 4.

In order to generate such a pulse voltage which is applied to the piezoelectric element 40, the focus drive mechanism of the camera has a drive circuit, which is shown in FIG. 8.

That is, the drive circuit generally has four switching elements "FET1" through "FET4"; a pair of constant-current circuits "I1" and "I2"; and four terminals to which a hi-level signal (referred to as "H" signal, hereinafter) and a low-level signal (referred to as "L" signal, hereinafter) are appropriately inputted from a control unit (not shown). In the arrangement, a pulse voltage having a saw-teeth-shaped waveform is applied across the terminals "P1" and "P2" of the piezoelectric element "A".

Figure 9:
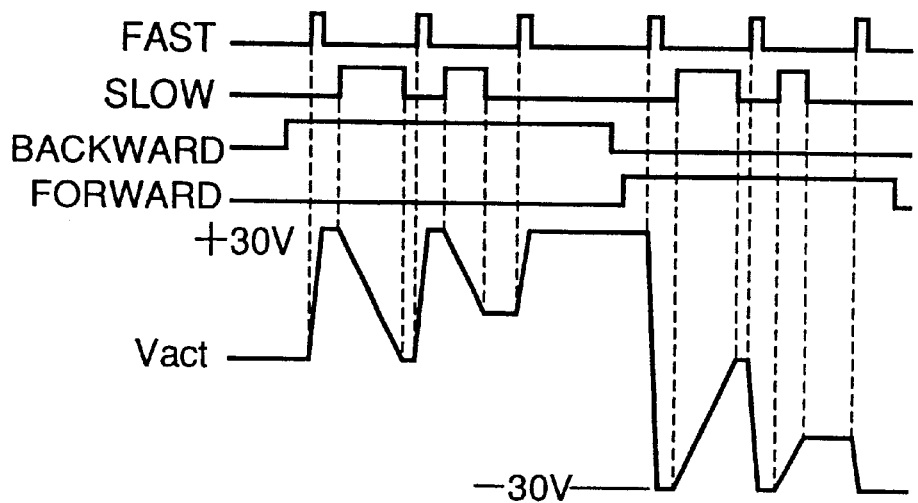
FIG. 9 is a timing chart of the drive circuit of FIG. 8.

FIG. 9 is a timing chart of pulses which are inputted to the drive circuit (see FIG. 8) of the focus drive mechanism, and which are outputted to the piezoelectric element 40 or "A" (see FIGS. 4 and 8 for example). In order to drive the moving body "M" (which corresponds to the second lens 34 in FIG. 4) in the backward direction (i.e. in the rightward direction in FIG. 4; and in the leftward direction in FIGS. 6A through 6F), firstly, the "H" signal is inputted to a "BACKWARD" terminal so as to turn on the "FET2", and one terminal "P1" of the piezoelectric element "A" is brought into the ground level. Next, the "H" signal is inputted to a "FAST" terminal so as to turn on the "FET3", and a voltage of +30 V supplied from an "HV" terminal is supplied to the other terminal "P2" of the piezoelectric element "A". At this stage, a drive voltage "Vact", which is exerted on the other terminal "P2" with respect to the one terminal "P1" of the piezoelectric element "A", suddenly rises from the ground level to +30 V. As a result, the piezoelectric element "A" is rapidly expanded, and is rapidly charged. Next, the "L" signal is inputted to the "FAST" terminal so as to turn off the "FET3", and then the "H" signal is inputted to a "SLOW" terminal so as to turn on the constant-current circuit "I2". As a result, the electric charge is gradually discharged from the other terminal "P2" of the piezoelectric element "A". That is, at this stage, the drive voltage "Vact" gradually falls down, and the piezoelectric element "A" slowly contracts or shrinks. Thereafter, the "H" signal is alternately inputted to the "FAST" terminal and the "SLOW" terminal, so that the drive voltage "Vact" relative to the piezoelectric element "A" comes to have a generally saw-teeth-shaped waveform that reciprocates between +30 V and the ground level. That is, the waveform of the drive voltage "Vact" suddenly rises when the "H" signal is inputted to the "FAST" terminal; and the waveform slowly falls when the "H" signal is inputted to the "SLOW" terminal.

By the way, it is to be noted that the amplitude of the drive voltage "Vact" varies depending on the time (which corresponds to its pulse width in FIG. 9) during which the "H" signal is being inputted to the "SLOW" terminal. In order to stop the driving operation by the piezoelectric element "A" or "40", the "L" signal is inputted to the "BACKWARD" terminal.

On the other hand, in order to drive the moving body "M" in the forward direction (i.e. in the leftward direction in FIG. 4; and in the rightward direction in FIGS. 6D through 6F), firstly, the "H" signal is inputted to a "FORWARD" terminal so as to turn on the "FET4", and the other terminal "P2" of the piezoelectric element "A" is brought into the ground level. Next, the "H" signal is inputted to a "FAST" terminal so as to turn on the "FET1", and a voltage of +30 V supplied from the "HV" terminal is supplied to the one terminal "P1" of the piezoelectric element "A". At this stage, the drive voltage "Vact" suddenly drops down to −30 V from the ground level. As a result, the piezoelectric element "A" is rapidly contracted, and is rapidly charged. Next, the "L" signal is inputted to the "FAST" terminal, and then the "H" signal is inputted to a "SLOW" terminal so as to turn on the constant-current circuit "I1". As a result, the electric charge is gradually discharged from the one terminal "P1" of the piezoelectric element "A". That is, at this stage, the drive voltage "Vact" gradually rises up, and the piezoelectric element "A" slowly expands. Thereafter, the "H" signal is alternately inputted to the "FAST" terminal and the "SLOW" terminal, so that the drive voltage "Vact" relative to the piezoelectric element "A" comes to have a generally saw-teeth-shaped waveform that reciprocates between −30 V and the ground level.

The photographing lens of the camera has a focus ring, and the rotation of the focus ring is detected by a power focus unit.

Figure 10:
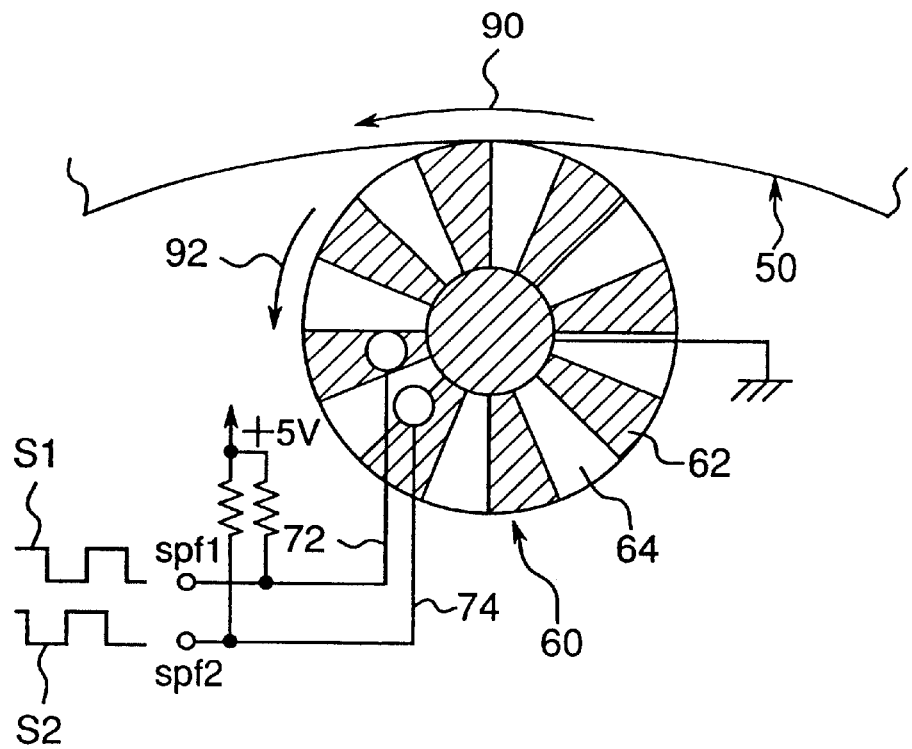
FIG. 10 is a schematic diagram of a power focus unit of the photographing lens.

That is, as schematically shown in FIG. 10, the power focus unit has a rotary disk 60 and a pair of contactors (i.e. contact pieces or contact members) 72 and 74. As indicated by a pair of arrows 90 and 92, the rotary disk 60 rotates interlocking with a rotation of the focus ring 50 of the photographing lens. Of course, the focus ring 50 and the rotary disk 60 also can rotate reversely. As shown in the figure, a peripheral surface of the rotary disk 60 has a pattern in which a plurality of electrically conductive portions 62 and a plurality of electrically insulated portions 64 are radially arranged alternately at regular intervals in a direction of a periphery of the rotary disk 60. Each conductive portion 62 is grounded (i.e. is connected to the ground).

Each of the pair of contactors 72 and 74 has one end which is connected to each of a pair of output terminals "spf1" and "spf2", respectively. Further, the one end of each of the pair of contactors 72 and 74 is pulled up to +5 V by, for example, a resistor of 680 Ω connected thereto. On the other hand, each of the pair of contactors 72 and 74 has the other end which is brought into contact with the pattern on the rotary disk 60. With this mechanism, the output level of the output terminal "spf1" ("spf2") comes to have +5 V when the other end of the contactor 72 (74) is brought into contact with the electrically insulated portion 64 of the pattern of the rotary disk 60; meanwhile, the output level of the output terminal "spf1" ("spf2") comes to have the ground level when the other end of the contactor 72 (74) is brought into contact with the electrically conductive portion 62.

The other end of the contactors 72 and 74 contact with the pattern on the rotary disk 60 at positions which are relatively displaced to each other (or relatively swerved to each other, or relatively away from each other) by an approximately ¾ cycle. With this arrangement, when the rotary disk 60 rotates, each of the output terminals "spf1" and "spf2" of the contactors 72 and 74 outputs a rectangular signal "S1", "S2", as shown in FIG. 10, in which the rectangular signals "S1" and "S2" are relatively displaced to each other (or relatively swerved to each other, or relatively away from each other) by an approximately ¼ cycle.

Figure 11:
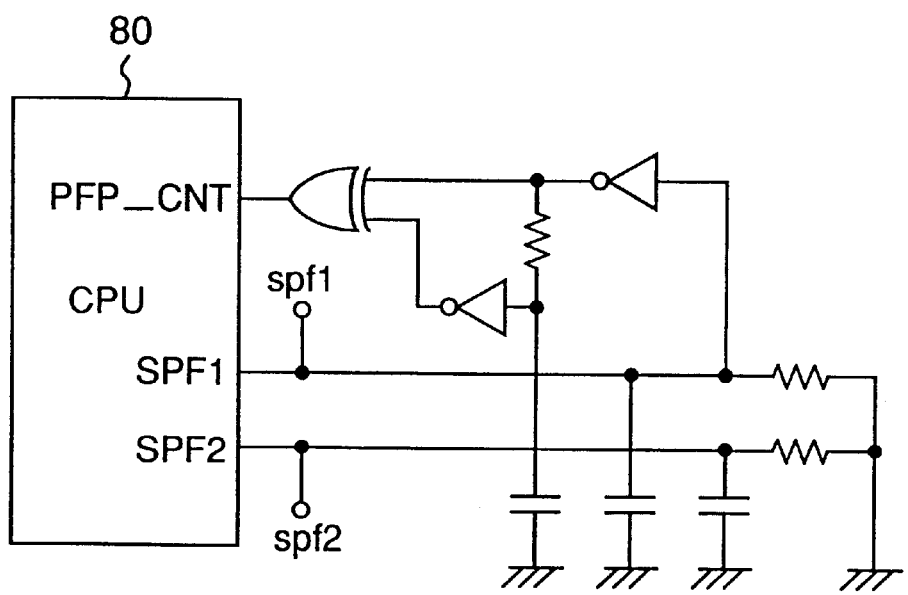
FIG. 11 shows a circuit for detecting a rotational amount of a focus ring of the power focus unit of FIG. 10.

As shown in a circuit diagram of FIG. 11, a drive circuit of the focus drive mechanism of the photographing lens comprises a CPU 80 which has an input port "SPF1" and an input port "SPF2", and the rectangular signals "S1" and "S2" from the output terminals "spf1" and "spf2" are inputted to the input ports "SPF1" and "SPF2", respectively. This arrangement is provided for detecting a rotational direction of the focus ring 50.

By the way, it is to be noted that a pull-down resistor (of 560 Ω, for example) and a noise reduction capacitor (of 0.022 μF, for example), are connected to the input ports "SPF1" and "SPF2", respectively, of the CPU 80. To an input port "PFP_CNT" of the CPU 80, is inputted the high-level "L" signal by employing an inverter, a resistor and an XOR element, only when the signal at the terminal "spf1" rises or falls down. This arrangement is provided for detecting an amount of rotation of the focus ring 50.

Next, a focus drive control, executed by the drive circuit comprising the CPU 80, of the photographing lens of the camera will be described below.

The focus drive control, fundamentally, is carried out in a form of "continuous pulse drive" or "block pulse drive".

That is, at time of driving the focus lens (i.e. the second lens 34 in FIG. 4) of the photographing lens at high speed, the "continuous pulse drive" is executed. The "continuous pulse drive" is a drive, similar to the conventional drive, in which the drive pulse is continuously supplied to the piezoelectric element 40. On the other hand, at time of driving the focus lens of the photographing lens at low speed, the "block pulse drive" is executed. The "block pulse drive" is a drive, in which a continuous supply of a drive pulse with a predetermined number of pulses to the piezoelectric element 40, and a stop to supply the drive pulse thereto for a predetermined time, are repeated. Depending upon a target drive velocity realized by the actuator of the focus drive mechanism, the drive of the actuator is switched between the "continuous pulse drive" and the "block pulse drive". With this arrangement, the actuator achieves any required target drive velocity.

More specifically, the block pulse drive is executed as follows.

Figure 18:
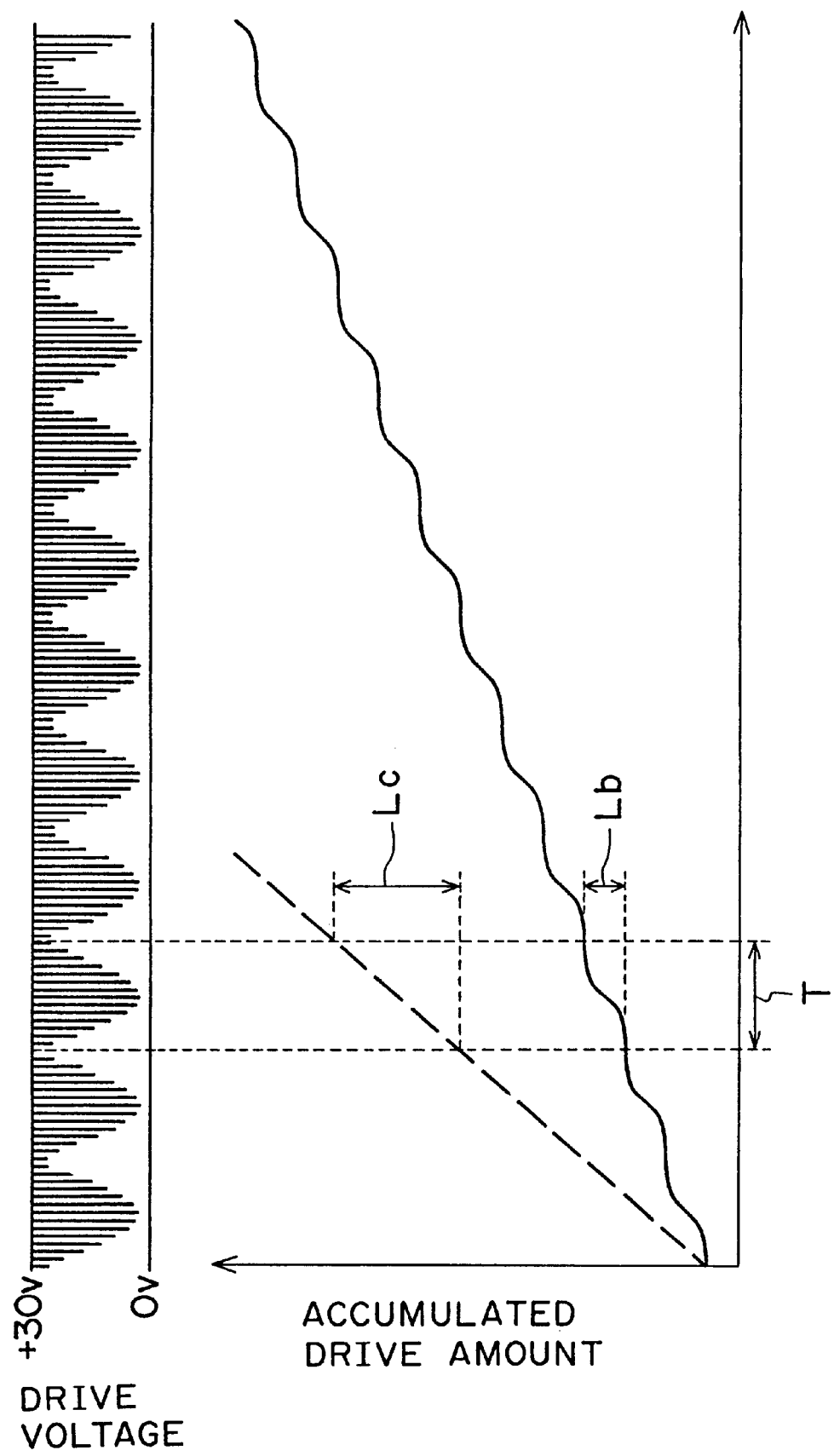
FIG. 18 is a chart showing a comparison between the "block pulse drive" and a "continuous pulse drive"

That is, a drive pulse with a specified frequency higher than an upper limit of audibility is continuously supplied to the piezoelectric element 40 so that the focus lens 34 gains a specified amount of movement "Lb", and the supply of the drive pulse is stopped when the focus lens 34 gains the specified amount of movement "Lb" (refer to FIG. 18). In other words, a group, or block, of drive pulse with the specified frequency for making the focus lens 34 gain the specified amount of movement is firstly formed, and then the supply of the drive pulse is made to stop for a specified amount of time. The block pulse drive is executed so that its average velocity (Vb=Lb/T) becomes the target drive velocity, by controlling a cycle, or a time, "Tb" between a block of drive pulse with the specified frequency and a block which comes after the previous block. The amount of movement "Lb", of the focus lens 34, corresponding to each block of the drive pulse, is set so as to exceed a resolution of positional detection of the focus lens 34. The amount of movement "Lb" of the focus lens 34 per each block of the drive pulse is monitored and a feedback is executed upon the next block of the drive pulse, so that the amount of movement "Lb" becomes a specified amount.

According to this "block pulse drive", the movement and stop of the focus lens 34 is repeated, respectively, for a short time. However, the movement of the focus lens 34, performed thereby, looks like a smooth continuous movement. Therefore, the "block pulse drive" is very effective in controlling the movement of the focus lens 34 at a low velocity in particular.

Figure 12:
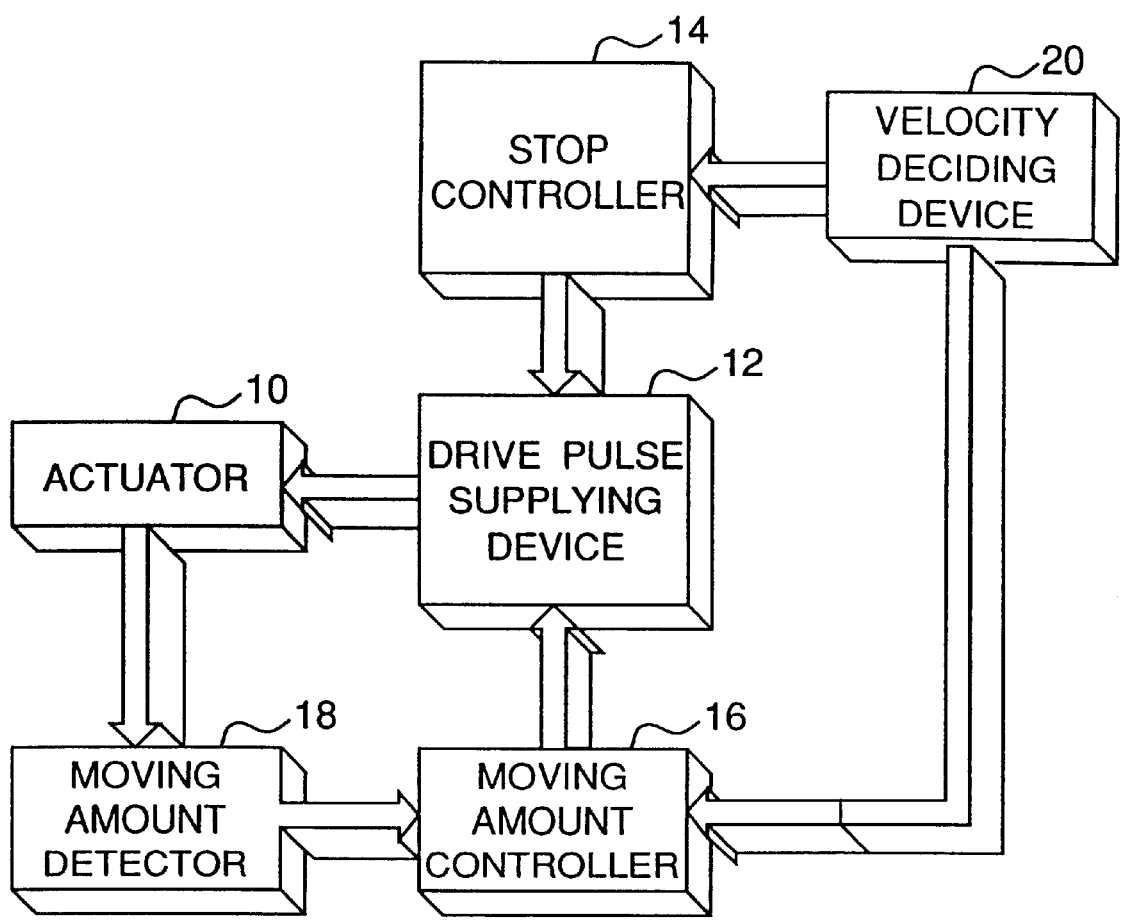
FIG. 12 is a block diagram used for executing a "block pulse drive" of the actuator of FIG. 4, according to the first embodiment.

In order to execute the "block pulse drive", the focus drive mechanism, which comprises the actuator 10 and the drive circuit including the CPU 80, is constructed, as shown in a block diagram of FIG. 12.

That is, an actuator 10 (including the piezoelectric element 40 and the drive rod 42, for example) for driving the focus lens 38, a drive pulse supplying device 12 (or pulse generating circuit) for driving the actuator 10 by supplying a pulse having a specified frequency thereto, a stop controller 14 for stopping the operation of the drive pulse supplying device 12 for a specified time, a moving amount controller 16 for setting the number of consecutive pulses included in one block of the drive pulse when the drive pulse supplying device 12 outputs the drive pulse, a moving amount detector 18 for detecting the amount of movement of the focus lens 34, and a velocity deciding device 20 for deciding the target drive velocity of the focus lens 34, are functionally interlocked with one another.

More specifically, the velocity deciding device 20 determines the drive velocity of the actuator 10 on a basis of the required velocity relative to the focus lens 34. In case that the focus drive mechanism of the photographing lens is driven under the auto-focus (AF) control, the required velocity is determined on a basis of a communication with a side of the camera body which requires the drive of the focus lens 34, or is determined on a basis of a remaining drive amount to the target location of the focus lens 34 by the actuator, by the velocity deciding device 20. Meanwhile, in case that the focus drive mechanism of the photographing lens is driven under the power focus (PF) control, the number of pulses being generated at time of manipulating the power focus ring 50 are counted, and the drive velocity is determined on a basis of the number of pulses being generated within a specified time (i.e. on a basis of the operating speed of the focus ring 50), by the velocity deciding device 20. In this velocity deciding device 20, the number of consecutive pulses included in one block of the drive pulse, and the drive amount, corresponding to one block of the drive pulse, of the focus lens 34 driven by the actuator, and the time during which the supply of the drive pulse is stopped, are determined by reference to the operating speed of the power focus ring 50 and a data table stored therein.

The moving amount controller 16 counts the number of the drive pulses which are supplied to the actuator 10 from the drive pulse supplying device 12. The moving amount controller 16 makes the drive pulse supplying device 12 operate until the number of the drive pulses, thus counted, reaches a specified number of consecutive pulses.

Figure 13:
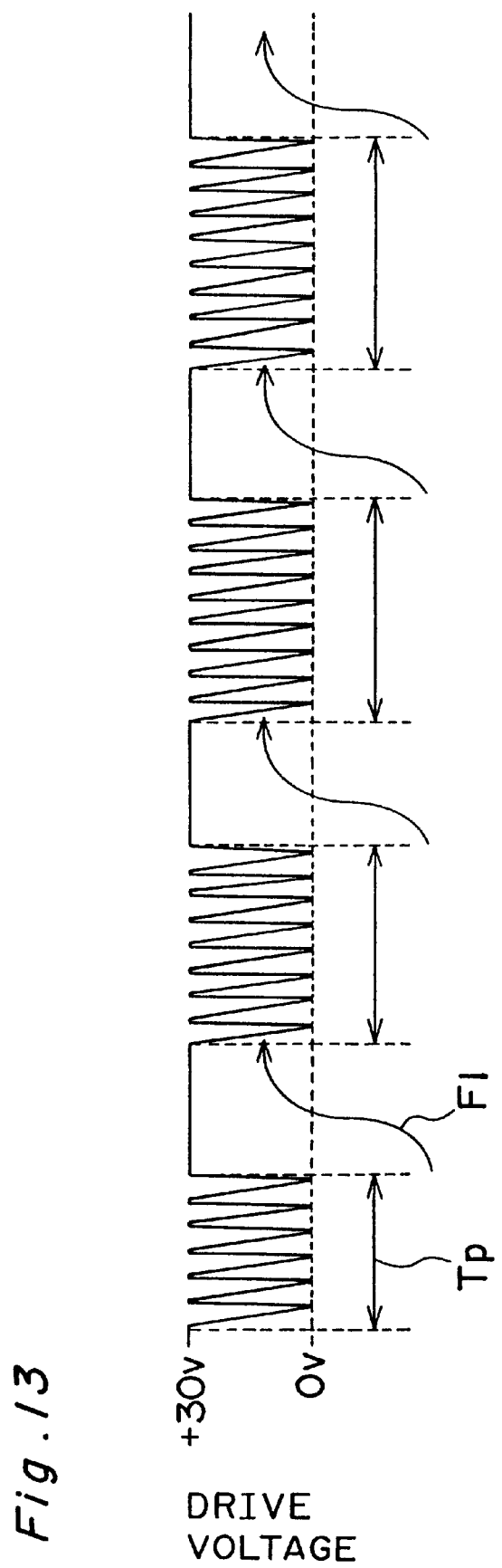
FIG. 13 is an explanatory view of a feedback control, for adjusting the number of pulses determined by a velocity deciding device, executed by a moving amount controller of FIG. 12.

The moving amount controller 16 works a feedback on the number of consecutive pulses included in one block of the drive pulse on the basis of the output of the moving amount detector 18, so that the drive amount of the actuator 10 (therefore, the drive amount of the focus lens 34 driven by the actuator 10) which is driven by the one block of the drive pulse becomes a specified amount determined by the velocity deciding device 20. For example, as shown in FIG. 13, in order to set the drive amount of the actuator to a specified amount during one cycle "T" of the block, the drive amount of the actuator during a time "Tp" when the drive pulse is being outputted, is monitored, and the number of drive pulses included in the next one block is adjusted, as shown by an arrow "F1", by the moving amount controller 16.

Upon detecting a termination of supply of the drive pulses included in one block by the moving amount controller 16, the stop controller 14 keeps stopping the supply of the drive pulse outputted from the drive pulse supplying device 12 until the specified time (i.e. pulse stopping time) determined by the velocity deciding device 20 elapses. And, when the specified time (i.e. pulse stopping time) elapses, the stop controller 14 releases the stop of supply of the drive pulse (i.e. the stop controller 14 starts the supply thereof).

Figure 14:
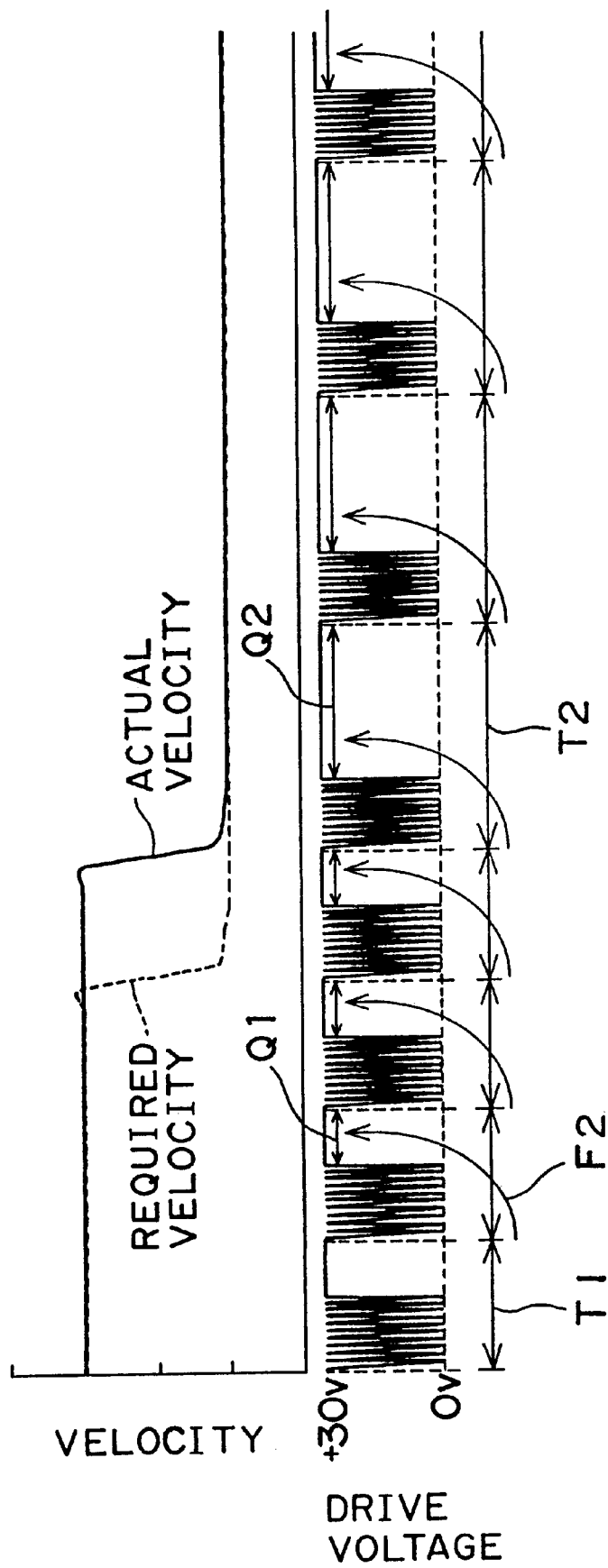
FIG. 14 is an explanatory view of a feedback control, for adjusting a pulse stopping time determined by the velocity deciding device, executed by a stop controller of FIG. 12.

The stop controller 14 works a feedback on the pulse stopping time on a basis of the output of the moving amount detector 18, so that the drive amount of the actuator 10, corresponding to one block of the drive pulse, becomes a specified amount determined by the velocity deciding device 20. For example, as shown in FIG. 14, in order to make constant the average velocity of the actuator corresponding to the one cycle "T" of the block, the drive amount, during the one cycle "T1", "T2" of the block pulse (i.e. the velocity), is monitored by the stop controller 14, and then the drive stopping time "Q1", "Q2"; after the drive pulse included in the next one block is supplied is adjusted, as indicated by an arrow F2, by the stop controller 14. In case that the number of pulses included in one block of the drive pulse is constant, and in case that the required velocity is smaller, then the stopping time "Q1", "Q2" is longer.

By the way, each block shown in FIG. 12 does not necessarily correspond to one member (or component) respectively, and includes an operational unit which is constituted by a plurality of members (or components). For example, each of the drive pulse supplying device 12, the stop controller 14 and the velocity deciding device 20 can be constituted as an electric circuit by a plurality of circuit elements. Alternatively, each block can be constituted as an operation (or function) of one or more microcomputers.

Figure 15:
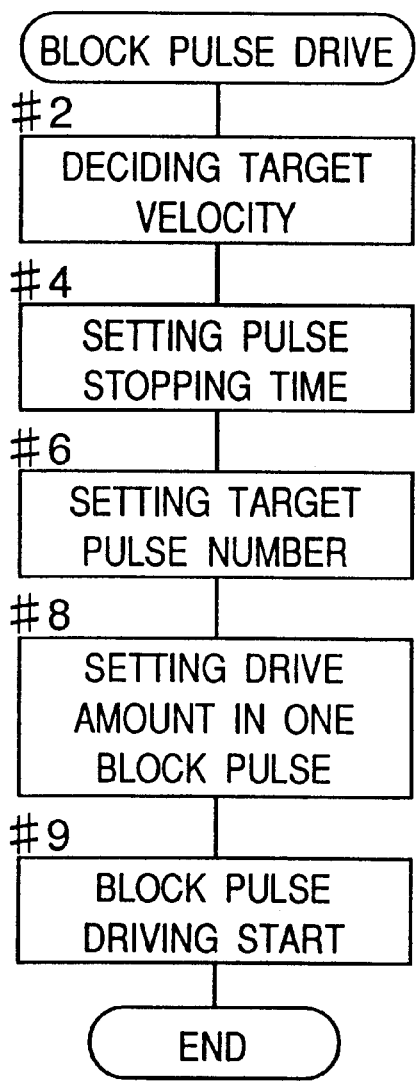
FIG. 15 is a flowchart showing a program executing the "block pulse drive" of the actuator of FIG. 4.
Figure 16:
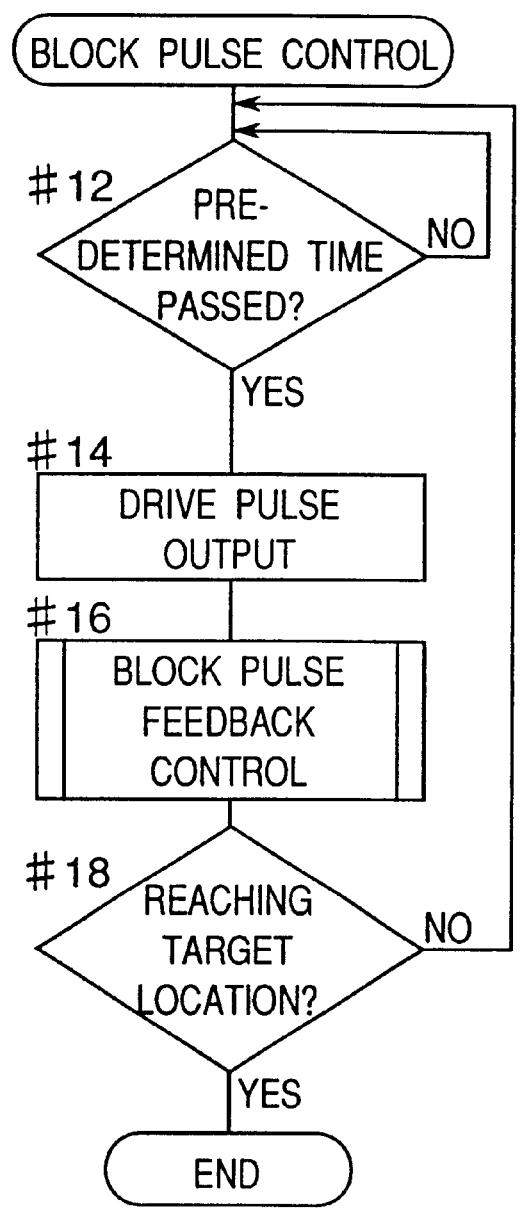
FIG. 16 is a flowchart showing a program executing the "block pulse drive" thereof.
Figure 17:
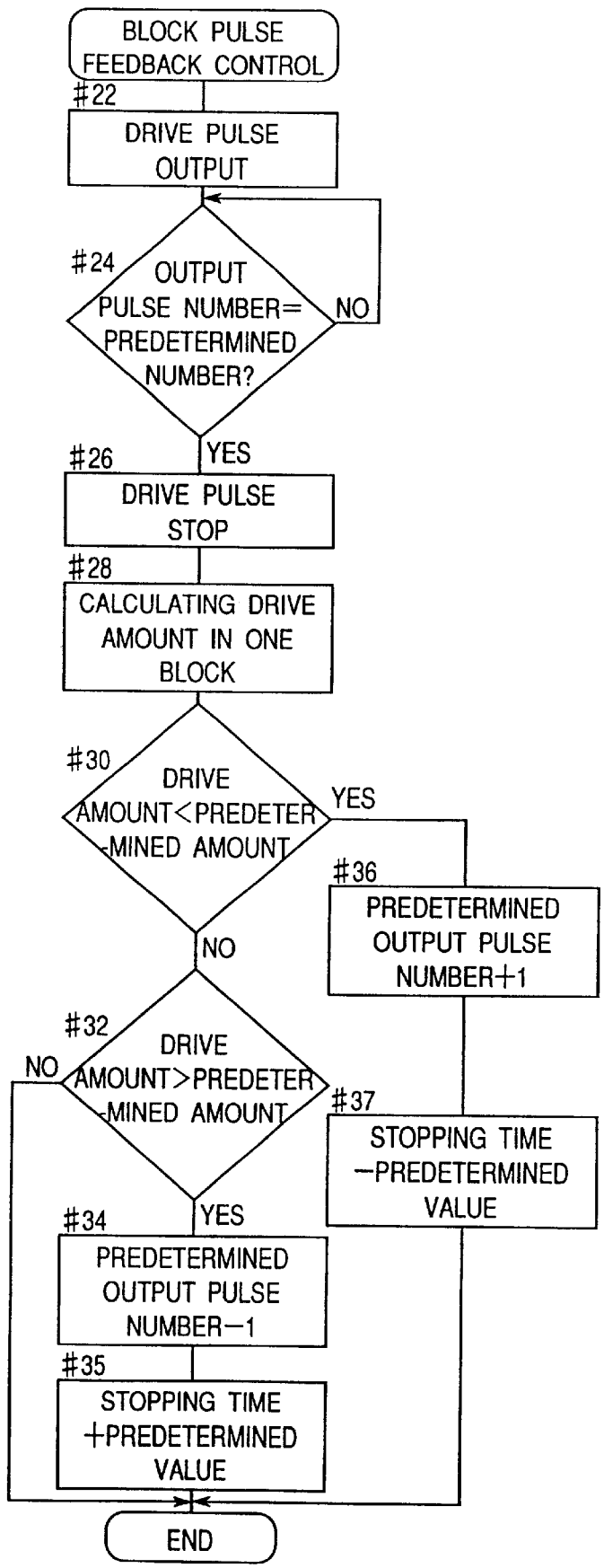
FIG. 17 is a flowchart showing a program executing the "block pulse drive" thereof.

Next, with reference to each of the flowcharts of FIGS. 15, 16 and 17, it is explained about how to execute the "block pulse drive" in more detail.

As shown in FIG. 15, firstly, a target velocity (or a target drive velocity) is determined in step #2 by the velocity deciding device. In case of the "AF" control, the velocity is determined from a remaining drive amount, and in case of the "PF" control, the velocity is determined in accordance with the number of operation pulses.

Next, in steps #4 through #8, a setting value of the pulse stopping time, a setting value of the number of pulses, and a setting value of a drive amount corresponding to one block of the drive pulse, are selected respectively from the data table, in compliance with the target velocity, of the actuator 10, which has been determined by the velocity deciding device 20. By the way, it is to be noted that these setting values may alternatively be determined on a basis of operation (or calculation).

Next, in step #9, the block pulse drive is started.

After executing the step #9, it is possible that a flow shown in FIGS. 16 and 17 is executed.

That is, as shown in FIG. 16, a lapse of a specified time (i.e. pulse stopping time) is awaited in step #12, and after the lapse of the specified time, the drive pulse starts to be outputted from the drive pulse supplying device 12 in step #14.

Next, in step #16, the block pulse feedback control, which will be described later, is executed.

Next, in step #18, the aforementioned steps #12 through #16 are repeated until the target location is reached.

Figure 21:
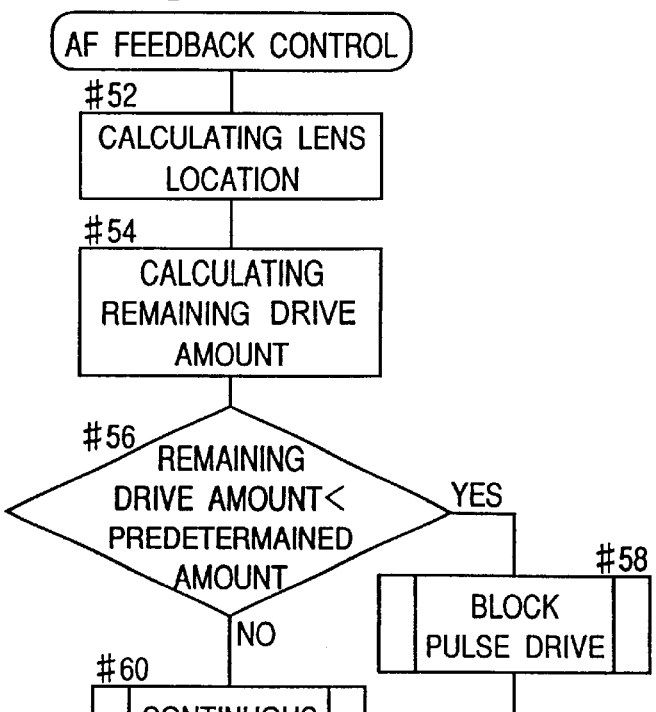
FIG. 21 is a flowchart showing a part of program executing the switching operation therebetween.
Figure 25:
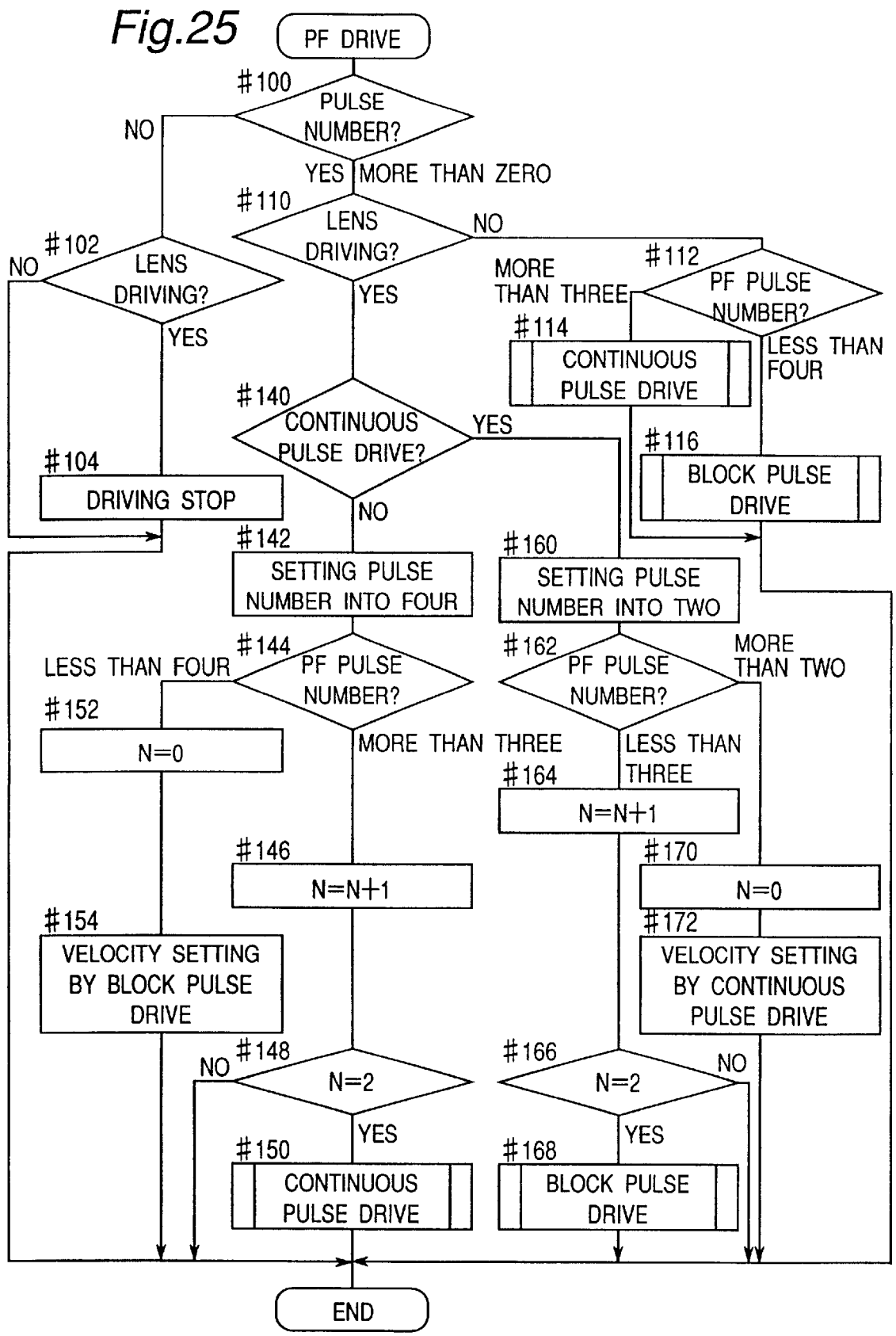
FIG. 25 is a flowchart showing a program for executing the switchover between the "block pulse drive" and the "continuous pulse drive", at time of the "PF" drive.

By the way, the aforementioned block pulse drive is used as a subroutine in step #58 of FIG. 21 and steps #116 and #168 of FIG. 25.

The subroutine (of the block pulse feedback control) in step #16 of FIG. 16, is as shown in FIG. 17.

That is, in steps #22 and #24, the drive pulse is continuously outputted from the drive pulse supplying device 12 until the number of pulses reaches the specified number of pulses, or the specified number of consecutive pulses (refer to the moving amount controller 16 in FIG. 12).

If the number of pulses reaches the specified number thereof, the program proceeds to step #26 in which the output of the drive pulse is stopped by the stop controller 14.

Next, in step #28, the drive amount of the actuator 10, driven by pulses included in one block of the drive pulse, is detected by the moving amount detector 18.

Next, in steps #30 and #32, the drive amount, detected in step #28, of the actuator 10 is compared with the target drive amount of the actuator 10.

If it is determined in step #30 that the drive amount is smaller than the specified drive amount, then the specified number of output pulses (i.e. the number of consecutive pulses) is increased by one, through the feedback operation by the moving amount controller 16, in step #36, and then the stopping time during which the drive pulse is not outputted from the drive pulse supplying device 12 is shortened by a specified time, through the feedback operation by the stop controller 14, in step #37, and then the program flow is returned.

On the other hand, if it is determined in step #32 that the drive amount is larger than the specified drive amount, then the specified number of output pulses (i.e. the number of consecutive pulses) is decreased by one, through the feedback operation by the moving amount controller 16, in step #34, and then the stopping time during which the drive pulse is not outputted from the drive pulse supplying device 12 is lengthened by a specified time, through the feedback operation by the stop controller 14, in step #35, and then the program flow is returned.

On the other hand, if it is determined in steps #30 and #32 that the drive amount is equal to the specified drive amount, then the program flow is directly returned without changing the specified number of output pulses and without changing the stopping time.

It has been explained about the feedback mechanisms for adjusting both the specified number of output pulses and the stopping time. Alternatively, it is possible to provided a feedback mechanism for adjusting only one of the specified number of output pulses and the stopping time. With this mechanism, the feedback control of the drive mechanism is simplified.

During the block pulse drive, the driving and stopping of the actuator are repeated within a short time; therefore, the average velocity thereof is reduced as a whole. The cycle in which the driving and stopping thereof are repeated, is selected so that the focus lens is smoothly driven without giving the user an unpleasant feeling, which is caused by the drive of actuator as shown in FIGS. 3A and 3B. This driving system is very effective particularly in controlling the actuator at a very low velocity or speed.

As a modification to the above embodiment, in order to set the drive amount of the actuator per block of the drive pulse in the cycle "T" to the predetermined drive amount, the amplitude of pulses of the drive pulse included in one block may be controlled under feedback control, instead of employing the feedback control of the number of consecutive pulses included in one block and/or the feedback control of the stopping time.

As another modification, in order to set the drive amount thereof to the predetermined drive amount, the feedback control may be executed so as to adjust the number of consecutive pulses within one block, the stopping time, and the amplitude of the drive pulse together.

If all the pulses (i.e. drive voltage) included within each block of the drive pulse which is employed for executing the "block pulse drive" have the same amplitude, the actuator suddenly starts and stops. This can be a cause to generate vibrations of the actuator (therefore, of the camera). In the effort to solve this problem, it has been found that it is possible to realize silence and smooth drive of the actuator in case that pulses within each block of the drive pulse are made gradually larger and gradually smaller, for example, in a sine-wave form.

Figure 26:
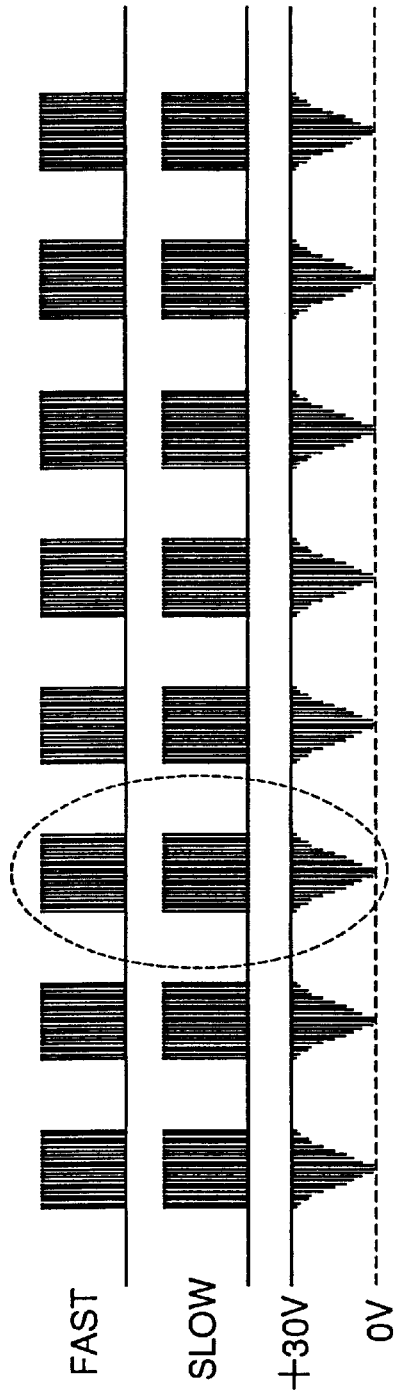
FIG. 26 shows a drive pulse for the "block pulse drive"
Figure 27:
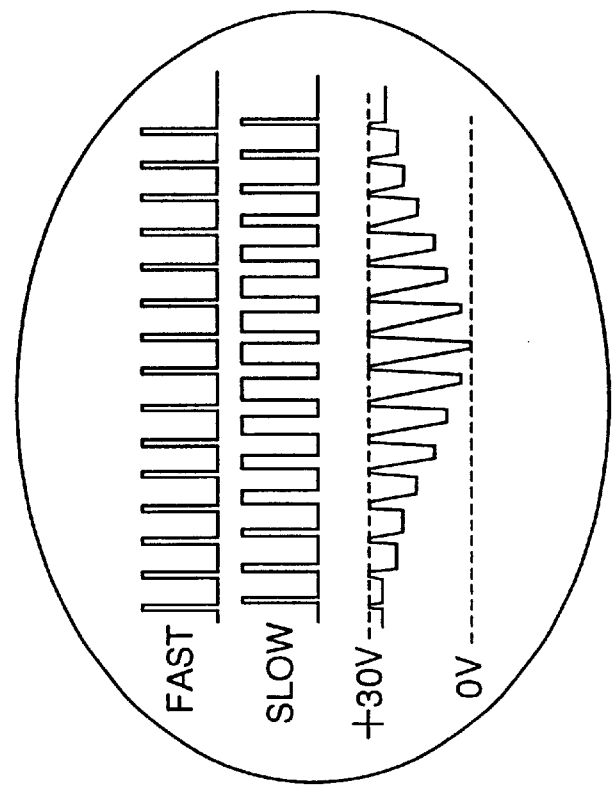
FIG. 27 is an enlarged view of a part of the drive pulse of FIG. 26.

For example, as shown in FIGS. 26 and 27, a pulse with a constant width is inputted to the "FAST" terminal of the drive circuit with a constant cycle, and another pulse is inputted to the "SLOW" terminal after the fall of the former pulse inputted to the "FAST" terminal. As shown in FIG. 27, the width of the pulse inputted to the "SLOW" terminal is small at the beginning part and the ending part of one block of the drive pulse, and the width thereof is gradually larger and then gradually smaller in the middle part of the one block. With this arrangement, the magnitude (i.e. application voltage to the piezoelectric element 40) of the pulse within the one block is gradually increased from its beginning and is gradually decreased towards its ending. This arrangement is repeated for every block. The application voltage, thus formed, changes like a generally sine-wave form between +30V and 0V, as shown in FIG. 27. In addition, it is to be noted that each of the pulses included in one block of the drive pulse has an amplitude with a generally mountain-shaped form.

According to the "block pulse drive" which employs the pulses with amplitude with generally mountain-shaped forms, the maximum velocity of the actuator (i.e. the velocity when the pulse stopping time is zero) is smaller than the maximum velocity of the actuator by the "continuous pulse drive" (i.e. the velocity when the amplitude of the pulses being continuously supplied to the actuator is equal to the maximum amplitude of the pulses employed by the "block pulse drive"), as shown in FIG. 18.

In the figure, a horizontal axis represents "time", a vertical axis represents "accumulated drive amount" of the actuator, a dashed line represents the "continuous pulse drive", and a solid line represents the "block pulse drive". As shown in the figure, the drive amount "Lb" by the "block pulse drive" is smaller than the drive amount "Lc" of the "continuous pulse drive", respectively, with respect to a specified constant time "T" (which is the cycle of the block of the drive pulse employed by the "block pulse drive").

Namely, provided that drive time during which the actuator is driven is the same, the drive amount by the "block pulse drive" is smaller than the drive amount by the "continuous pulse drive". Also, the limit of the maximum velocity of the "block pulse drive" is smaller than the limit of the maximum velocity of the "continuous pulse drive" Therefore, the "block pulse drive" is not suitable for making the actuator move at a higher velocity.

In view of these technical aspects, the actuator 10 of the camera according to the embodiment is controlled by a combination of the "block pulse drive" and the "continuous pulse drive".

Figure 19:
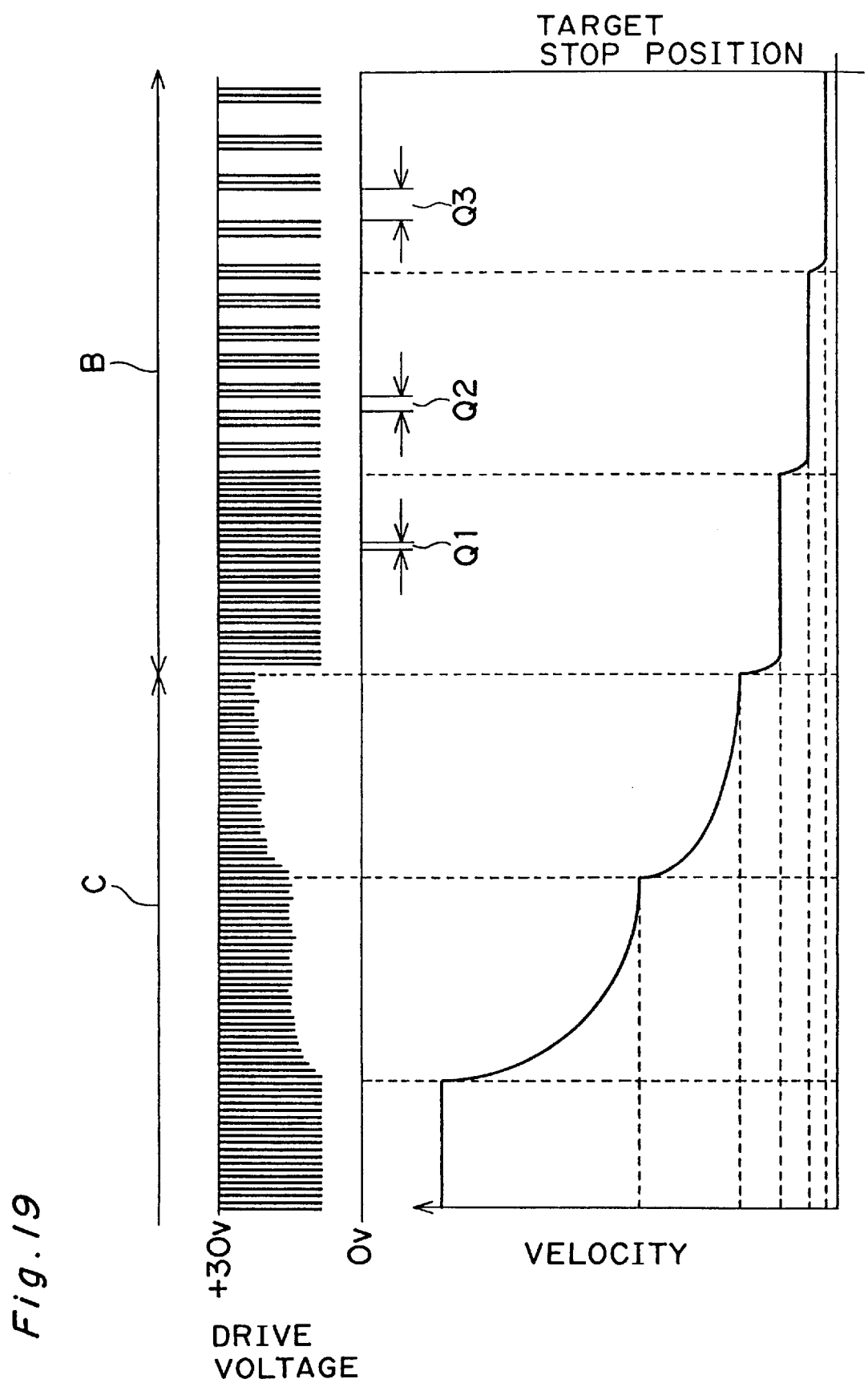
FIG. 19 is a chart showing a drive control of the actuator by a combination of the "block pulse drive" and the "continuous pulse drive"

Namely, for example, at time of the "AF" drive, as shown in FIG. 19, during which time the actuator (therefore, the focus lens) gradually speeds down as it approaches the target location so as not to overrun the target location, the "continuous pulse drive C" is executed at time of high velocity whereas the "block pulse drive B" is executed at time of low velocity.

More specifically, for example, the "continuous pulse drive" is executed at its maximum velocity (V) until the focus lens reaches a location 200 $\mu$m before the target location. Next, when the focus lens reaches this location, the amplitude of the drive pulse is reduced so as to decrease the velocity of the actuator down to half (V/2) the maximum velocity (V). Next, when the focus lens reaches a location 100 $\mu$m before the target location, the amplitude of the drive pulse is further reduced so as to decrease the velocity of the actuator down to half (V/4) the half velocity (V/2). Next, when the focus lens reaches a location 50 $\mu$m before the target location, the "continuous pulse drive" is switched to the "block pulse drive" so as to further reduce the velocity thereof down to half (V/8) the half velocity (V/4). Next, when the focus lens reaches a location 30 $\mu$m before the target location, the pulse stopping time is prolonged so as to further reduce the velocity thereof down to half (V/16) the half velocity (V/8). Next, when the focus lens reaches a location 5 $\mu$m before the target location, the pulse stopping time is further prolonged in order to further reduce the velocity thereof to half (V/32)) the half velocity (V/16). And, finally, when the focus lens reaches the target location, the focus lens is stopped.

As described above, the drive of the actuator only by one drive method (i.e. the "continuous pulse drive") is unstable in the range of lower velocity, as shown in FIGS. 2A, 2B, 3A and 3B. However, the drive of the actuator by a pair of drive methods (i.e. the "block pulse drive" and the "continuous pulse drive") which can be selectively switched during the drive control, is stable and smooth in the same range of lower velocity.

Figure 20:
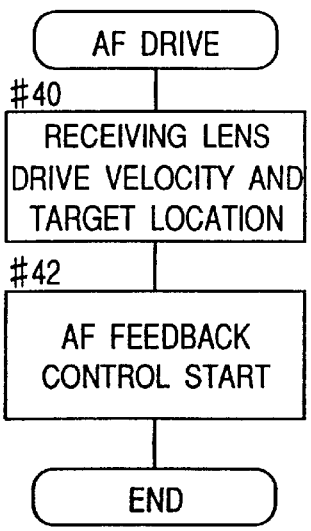
FIG. 20 is a flowchart showing a part of program executing a switching operation between the "block pulse drive" and the "continuous pulse drive", at time of the "AF" drive.
Figure 22:
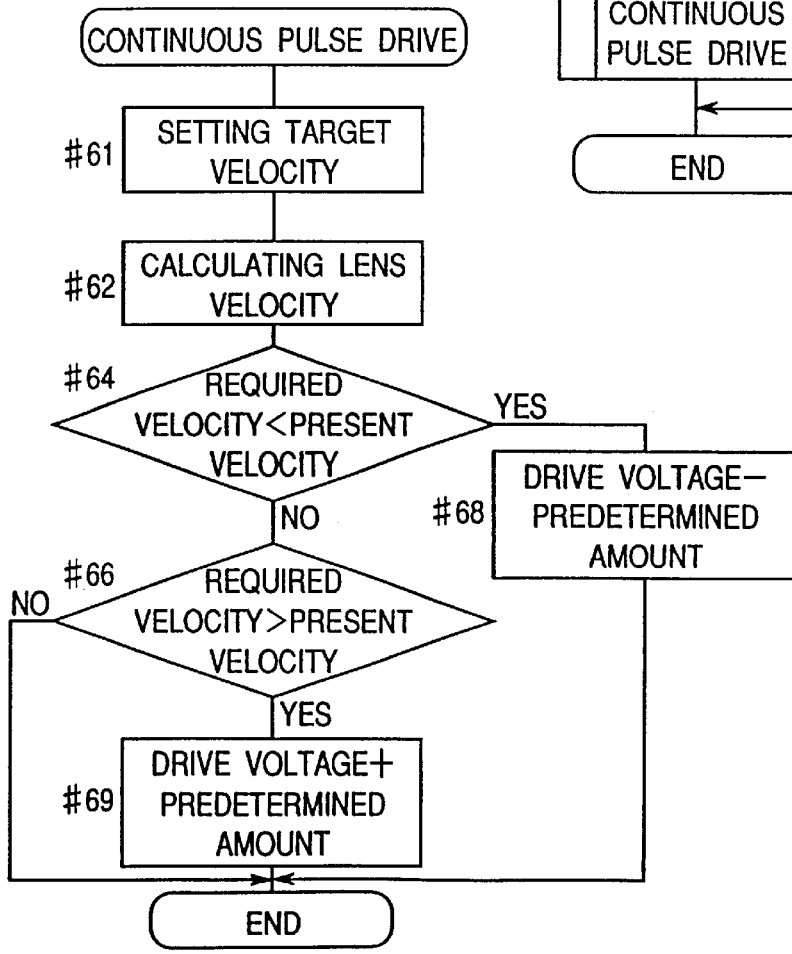
FIG. 22 is a flowchart showing a part of program executing the switching operation therebetween.

At time of the "AF" drive, a drive control is executed in accordance with each of the flowcharts of FIGS. 20, 21 and 22.

That is, as shown in FIG. 20, firstly, in step #40, a lens drive velocity and a lens drive target location are received from a side of the camera body.

Next, in step #42, an "AF" feedback control is started. This "AF" feedback control in step #42 is, more specifically, executed in accordance with a procedure shown in FIG. 21.

That is, in step #52, a current location of the focus lens is calculated or found, and in step #54, the remaining drive amount to the target location is calculated.

Next, in step #56, the remaining drive amount is compared in magnitude with a predetermined amount that serves as a reference amount, with which amount it is determined which pulse drive ("block pulse drive" or "continuous pulse drive") should be employed.

If the remaining drive amount is greater than or is equal to the reference amount, then the "continuous pulse drive" is executed in step #60. On the other hand, if the remaining drive amount is smaller than the reference amount, then the "block pulse drive" is executed in step #58 (refer to FIGS. 15 through 17).

The "continuous pulse drive" in step #60 in FIG. 21, more specifically, is executed as shown in FIG. 22.

Namely, firstly, in step #61, the required drive velocity (or target drive velocity) is set.

Next, in step #62, the drive velocity of the focus lens is calculated.

Next, in step #64, the required drive velocity is compared in magnitude with the current velocity.

If the required drive velocity is smaller than the current velocity, then the program proceeds to step #68 in which the drive voltage is reduced by a specified amount.

On the other hand, if it is determined that the required drive velocity is equal to the current velocity in step #66, then the drive voltage is kept unchanged.

On the other hand, if the required drive velocity is greater than the current velocity, then the drive voltage is increased by a specified amount in step #69.

Figure 23:
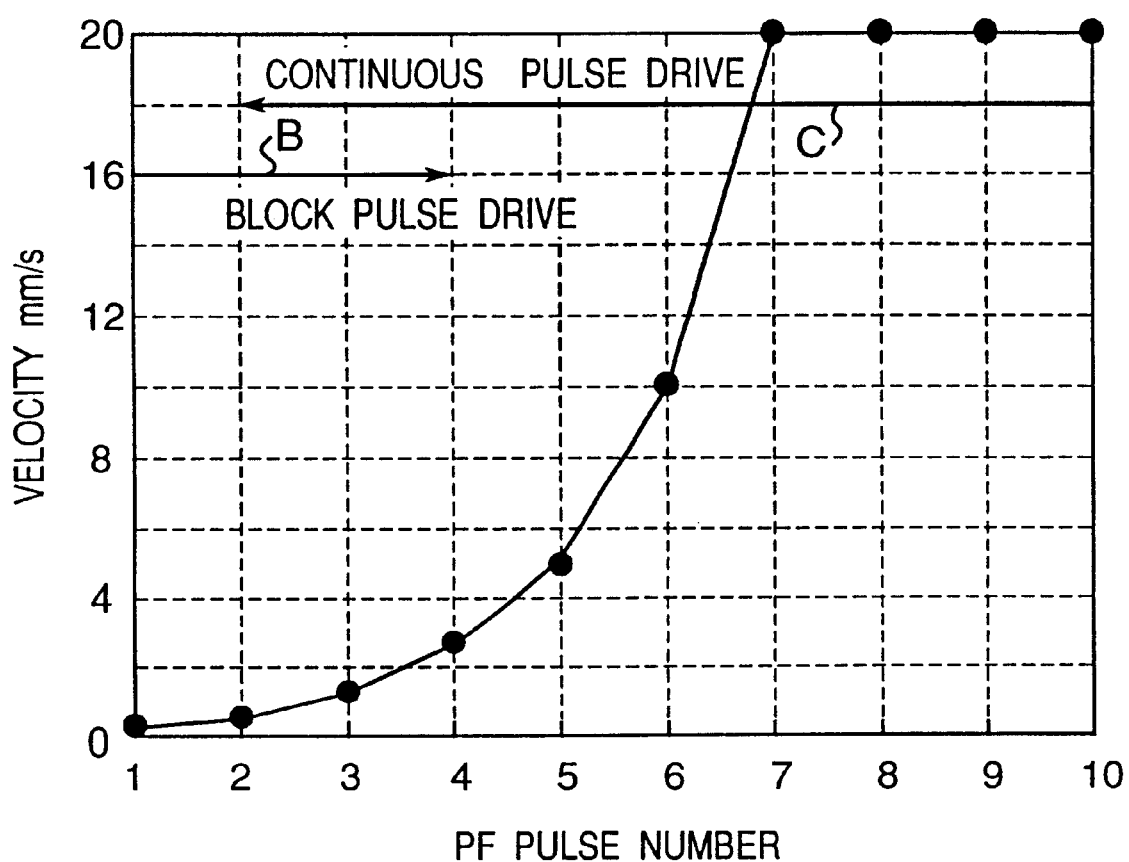
FIG. 23 is a graph showing a relation between a velocity of the actuator and the "PF" pulse number, relating to a switchover between the "block pulse drive" and the "continuous pulse drive", at time of the "PF" drive.

Meanwhile, in regard to the "PF" control which is employed during the manual focus operation, as shown in FIG. 23, its drive system is switched between the "block pulse drive" and the "continuous pulse drive" in accordance with the required velocity. In the figure, the horizontal axis ("PF PULSE NUMBER" in the figure) represents a number of pulses (also referred to as "PF pulses", hereinafter) which are generated in a specified time period while the focus ring 50 is being operated, and the vertical axis ("VELOCITY" in the figure) represents an aimed value of the target drive velocity. When the focus ring 50 is operated more quickly, the number of the "PF" pulses increases; therefore, the aimed value also increases. On the other hand, when the focus ring 50 is operated more slowly, the number of the "PF" pulses decreases; therefore, the aimed value also decreases.

It is not preferable to frequently switch the drive system between the block pulse drive and the continuous drive pulse. Therefore, there is provided a hysteresis.

That is, if the number of the "PF" pulses keeps decreasing, the drive system is switched from the "continuous pulse drive" (refer to "C" in the figure) to the "block pulse drive" (refer to "B" in the figure) only if the number of the "PF" pulses during the specified time period becomes smaller than three. On the other hand, if the number of the "PF" pulses keeps increasing, the drive system is switched from the "block pulse drive" to the "continuous pulse drive" only if the number of the "PF" pulses during the specified time period becomes larger than three.

Figure 24:
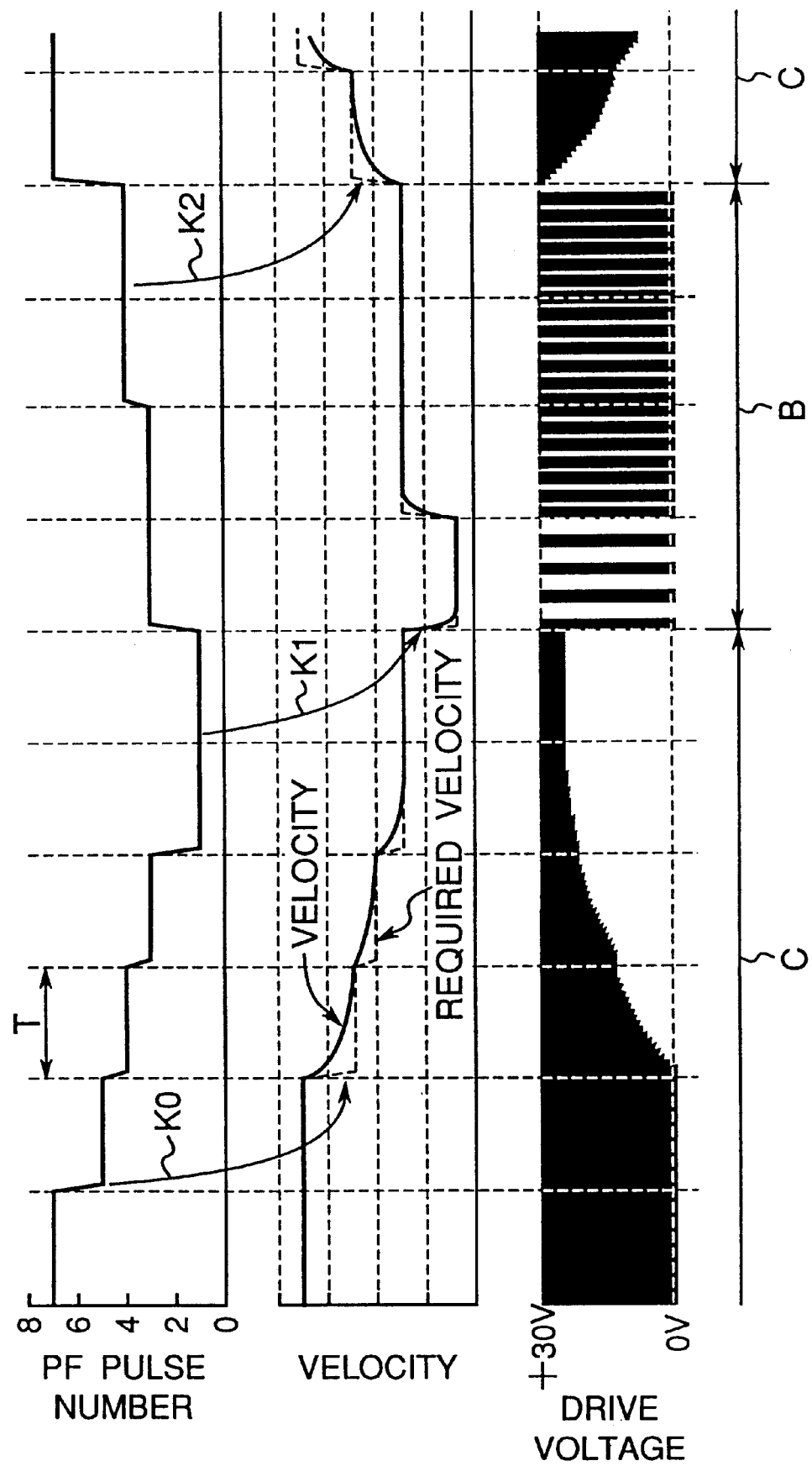
FIG. 24 is a chart showing a drive pulse which is switched between the "block pulse drive" and the "continuous pulse drive", at time of the "PF" drive.

For example, in the case of the "continuous pulse drive" as indicated by a reference numeral "K0" in FIG. 24, the number of the "PF" pulses is detected every constant cycle "T" (16 ms, for example), and the required velocity to the actuator is determined on the basis of the number thereof. If the number of the "PF" pulses per cycle "T"0 becomes smaller than three continuously twice, then the drive system is switched from the "continuous pulse drive" to the "block pulse drive" in the next cycle "T", as indicated by a reference numeral "K1". On the hand, if the number of the "PF" pulses per cycle "T" becomes larger than three continuously twice, then the drive system is switched from the "block pulse drive" to the "continuous pulse drive"0 in the next cycle "T", as indicated by a reference numeral "K2".

According to the mechanism, the drive system is switched between the "block pulse drive" and the "continuous pulse drive" only if the condition for the switchover (i.e. the condition of if the number of the "PF" pulses per cycle "T" becomes smaller or larger than a reference number such as "three" continuously a certain number of times such as "twice") is satisfied. Therefore, with this mechanism, a frequent switchover between the two drive systems is surely prevented, and an effective, stable drive of the actuator is realized.

More specifically, the drive system is switched according to a flowchart shown in FIG. 25.

That is, in step #100, it is determined whether or not the number of the "PF" pulses is counted during the constant cycle "T". If the number thereof is not counted at all, then in steps #102 and #104, the drive of the focus lens is stopped if the lens is being driven. On the other hand, in in step #100, if one or more "PF" pulses is/are counted, it is determined whether or not the lens is being driven in step #110.

If the lens is not being driven, the program proceeds to step #112 in which it is determined whether the number of the "PF" pulses in the specified cycle "T" is greater than three or is smaller than four. If the number is smaller than four, the program proceeds to step #116 where the "block pulse drive" is set. On the other hand, if the number is larger than three, the program proceeds to step #114 where the "continuous pulse drive" is set.

In step #110, if the focus lens is being driven, in step #140, it is determined whether or not the current driving is the "continuous pulse drive". If it is determined that the current driving is the "continuous pulse drive", then the program proceeds to step #160 where the number of drive pulses for the switchover is set to be two, and it is determined in step #162 whether the number of the "PF" pulses in the specified cycle "T" is smaller than three or is greater than two.

If the number is smaller than three, then, "N" is incremented by one in step #164, and it is determined in step #166 whether or not "N" is equal to two. If "N" is equal to two, then the program proceeds to step #168 where the drive control is switched from "continuous pulse drive" to the "block pulse control". On the other hand, if "N" is not equal to two, the step #168 is skipped.

On the other hand, if it is determined in step #162 whether the number of the "PF" pulses in the specified cycle "T" is greater than two, the program proceeds to step #170 where zero is allotted to "N". Then, in step #172, a velocity is set for the "continuous pulse drive".

Meanwhile, if it is determined that the current drive of the actuator is not the "continuous pulse drive" in step #142, then the program proceeds to #142 where the number of the drive switching pulses is set to be four, and then it is determined in step #144 whether the number of the "PF" pulses in the specified cycle "T" is smaller than four or is greater than three.

If it is determined that the number is smaller than four in step #144, the program proceeds to step #152 where zero is allotted to "N", and then the program proceeds to step #154 where the velocity setting of "block pulse drive" is executed.

On the other hand, if it is determined that the number is greater than three in step #144, then the program proceeds to step #146 in which "N" is incremented by one.

Then, the program proceeds to step #148 where it is determined whether or not "N" is equal to two. If it is determined that "N" is equal to two, then the program proceeds to step #150 in which the drive system is switched from the "block pulse control" to the "continuous pulse drive". On the other hand, if it is determined that "N" is not equal to two, then the step #150 is skipped.

Secondly, referring to some of the figures which have been used for describing the first embodiment, and to FIG. 28, the description is made below upon the focus drive mechanism, employing the electromechanical transducer, of the photographing lens of the camera, according to the second embodiment. Because there are some similarities, in part, in construction and function between the first embodiment and the second embodiment, the construction and function substantially similar to those in the first embodiment are explained with reference to the figures used for explaining the first embodiment, as common figures to the both embodiments.

Namely, a mechanical part of the photographing lens of the camera of the second embodiment is similar to the part of the first embodiment, as shown in FIGS. 4 and 5; the principle of the actuator driving of the second embodiment is similar to the principle of the first embodiment, as shown in FIGS. 6 and 7; the drive circuit for driving the actuator and its function of the second embodiment are similar to those of the first embodiment, respectively, as shown in FIGS. 8 and 9; and the power focus unit of the photographing lens and the circuit diagram for detecting a rotational amount of the focus ring of the second embodiment are similar to those of the first embodiment, respectively, as shown in FIGS. 10 and 11.

Figure 28:
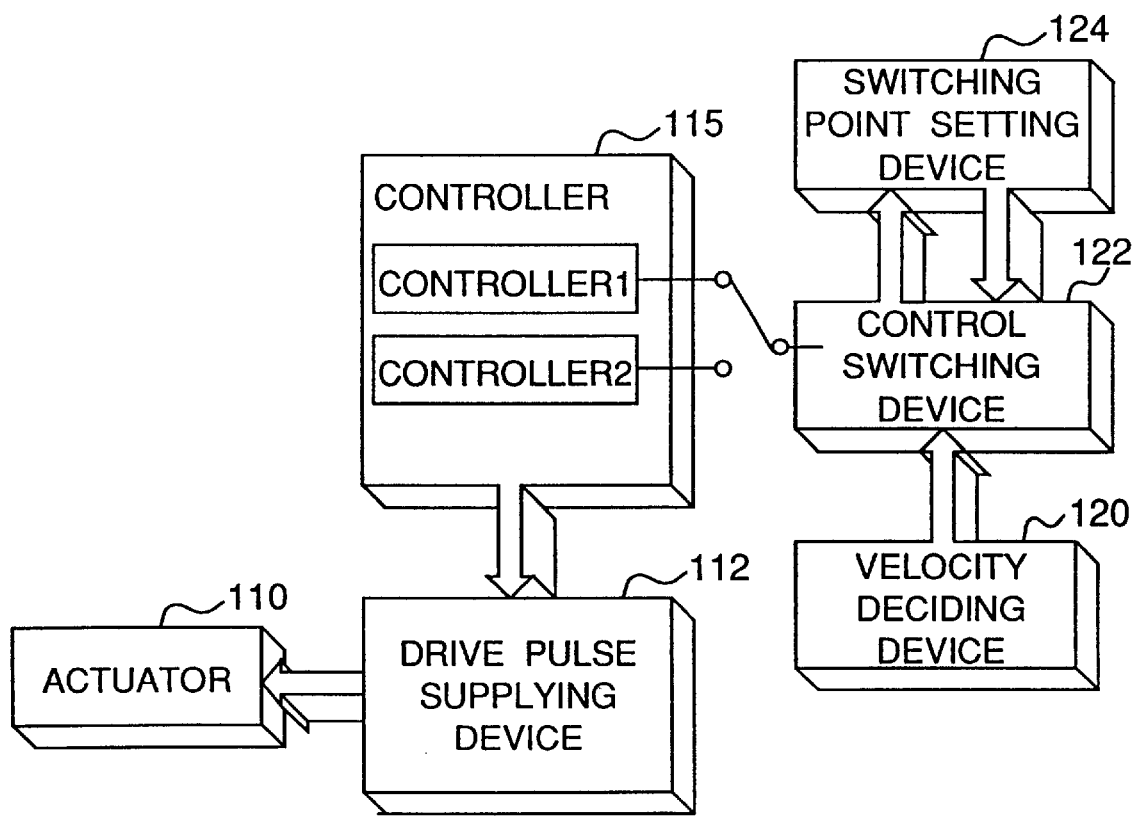
FIG. 28 is a block diagram used for executing a "block pulse drive" of the actuator of FIG. 4, according to the second embodiment.

On the other hand, the mechanism for executing the "block pulse drive" and the "continuous pulse drive" of the second embodiment is different from the mechanism therefor of the first embodiment, as shown in FIG. 28.

That is, an actuator 110 (including the piezoelectric element 40 and the drive rod 42, for example) for driving the focus lens 38, a drive pulse supplying device 112 (or pulse generating circuit) for driving the actuator 110 by supplying a pulse having a specified frequency thereto, a controller 115 (including a "CONTROLLER 1" controller a "CONTROLLER 2") 115 for controlling an operation of the drive pulse supplying device 112, a control switching device 122 for switching between the plurality of controllers 115, a velocity deciding device 120 for deciding a target drive velocity of the focus lens 34, and a switching point setting device 124, are functionally interlocked with one another.

More specifically, the controller 115 includes the "CONTROLLER 1" for executing the "continuous pulse drive", and the "CONTROLLER 2" for executing the "block pulse drive".

The velocity deciding device 120 determines the drive velocity of the actuator 110 on a basis of the required velocity relative to the focus lens 34. In case that the focus drive mechanism of the photographing lens is driven under the auto-focus (AF) control, the required velocity is determined on a basis of a communication with a side of the camera body which requires the drive of the focus lens 34, or is determined on a basis of a remaining drive amount to the target location of the focus lens 34 by the actuator, by the velocity deciding device 120.

Meanwhile, in case that the focus drive mechanism of the photographing lens is driven under the power focus (PF) control, the number of pulses being generated at time of manipulating the power focus ring 50 are counted, and the drive velocity is determined on a basis of the number of pulses being generated within a specified time (i.e. on a basis of the operating speed of the focus ring 50), by the velocity deciding device 120. In this velocity deciding device 120, the number of consecutive pulses included in one block of the drive pulse, and the drive amount, corresponding to one block of the drive pulse, of the focus lens 34 driven by the actuator, and the time during which the supply of the drive pulse is stopped, are determined by reference to the operating speed of the power focus ring 50 and a data table stored therein.

The control switching device 122 compares an output (i.e. a target velocity) from the velocity deciding device 120 with a control switching point (i.e. a reference velocity) which is set by the switching point setting device 124, and determines whether or not there is need of switching the drive control between the "block pulse device" and "continuous pulse device". And if the control switching device 122 determines that there is need of switching the drive control therebetween, the control switching device 122 switches the controller 115 (i.e. it selects one of the "CONTROLLER 1" and "CONTROLLER 2").

The switching point setting device 124 resets the control switching point (i.e. the reference velocity) in accordance with the one, which the control switching device 122 has selected, of the "CONTROLLER 1" and "CONTROLLER 2".

The drive pulse with a specified frequency higher than an upper limit of audibility is continuously supplied to the piezoelectric element 40 so that the focus lens 34 gains a specified amount of movement "Lb", and the supply of the drive pulse is stopped when the focus lens 34 gains the specified amount of movement "Lb" (refer to FIG. 18). In other words, a group, or block, of drive pulse with the specified frequency for making the focus lens 34 gain the specified amount of movement is firstly formed, and then the supply of the drive pulse is made to stop for a specified amount of time. The block pulse drive is executed so that its average velocity (Vb=Lb/T) becomes the target drive velocity, by controlling a cycle, or a time, "Tb" between a block of drive pulse with the specified frequency and a block which comes after the previous block. The amount of movement "Lb", of the focus lens 34, corresponding to each block of the drive pulse, is set so as to exceed a resolution of positional detection of the focus lens 34.

For example, as shown in FIG. 14, in order to make constant the average velocity of the actuator corresponding to the one cycle "T" of the block, the drive amount during the one cycle "T1", "T2" of the block pulse (i.e. the velocity) is monitored, and then the drive stopping time "Q1", "Q2" after the drive pulse included in the next one block is supplied is adjusted, as indicated by the arrow F2. In case that the number of pulses included in one block of the drive pulse is constant, and in case that the required velocity is smaller, then the stopping time "Q1", "Q2" is longer.

During the block pulse drive, the driving and stopping of the actuator are repeated within a short time; therefore, the average velocity thereof is reduced as a whole. The cycle in which the driving and stopping thereof are repeated, is selected so that the focus lens is smoothly driven without giving the user an unpleasant feeling, which is caused by the drive of actuator as shown in FIGS. 3A and 3B. This driving system is very effective particularly in controlling the actuator at a very low velocity or speed.

By the way, as a modification to the embodiment, setting the velocity in the cycle "T" of one block of the drive pulse to a specified amount, can be realized by executing a feedback control of the number of pulses per block of the drive pulse, and/or by executing a feedback control of the amplitude of the drive pulse per block thereof.

In the arrangement, similar to the first embodiment, a drive pulse with a sine-wave form per each block is generated and employed (see FIGS. 18, 26 and 27). Further, in order to enable the actuator to move at a higher velocity, the actuator is controlled by a combination of the "block pulse drive" control and the "continuous pulse drive" control. Namely, referring to the first embodiment, the "AF" drive control is executed on a basis of the control shown in FIG. 19; meanwhile, the "PF" drive control is executed on a basis of the control shown in FIGS. 23, 24 and 25.

By the way, each block shown in FIG. 28 does not necessarily correspond to one member (or component) respectively, and includes an operational unit which is constituted by a plurality of members (or components). For example, each of the velocity deciding device 120, the control switching device 122 and the switching point setting device 124 can be constituted as an electric circuit by a plurality of circuit elements. Alternatively, each block can be constituted as an operation (or function) of one or more microcomputers.

As apparent from the aforementioned description, by suitably selecting one of the "block pulse drive" and "continuous pulse drive" in accordance with the required drive speed of the actuator, it is possible not only to drive the actuator smoothly at a higher velocity, but also to drive the actuator smoothly at a lower velocity, without changing the frequency of the drive pulse supplied to the actuator.

The aforementioned embodiment has a construction in which a stationary body is fixed to one end, of the electromechanical transducer, in a direction in which the electromechanical transducer expands and contracts, in which a drive frictional member is fixed to the other end of the electromechanical transducer, and in which the moving body is frictionally mounted relative to the drive frictional member.

Alternatively, the moving body can be fixed to one end of the electromechanical element in a direction in which the electromechanical element expands and contracts, in which a drive frictional member is fixed to the other end of the electromechanical element, and in which the drive frictional member is frictionally mounted relative to a stationary body.

According to the construction, for example, if the electromechanical transducer is provided with the drive pulse which has a generally saw-teeth-shaped wave form, when the drive pulse rises or falls down abruptly, the force of inertia of the moving body, or the force of inertia of a whole driven structure which includes the moving body and an object, for example like the focus lens, driven by the moving body, is greater than a frictional force exerting between the drive frictional member and the stationary body. As a result, there occurs a slide between the drive frictional member and the stationary body, and the moving body does not move relative to the stationary body whereas only the drive frictional member moves relative thereto. Meanwhile, when the drive pulse rises or falls down gently, the force of inertia of the moving body is smaller than the frictional force exerting between the drive frictional member and the stationary body. As a result, there does not occur the slide between the drive frictional member and the stationary body; thus, the moving body moves relative to the stationary body. By the way, in this construction, generally, it is necessary that the moving body has a mass that is greater than a mass of the drive frictional member.

In each of the above two constructions, if the frequency of the drive pulse increases, when the electromechanical element both expands and contracts, there starts occurring the relative slide between the drive frictional member and the moving body, or between the drive frictional member and the stationary body. In each case, the relative slide therebetween is different in magnitude and direction, depending upon the expansion and the contraction of the electromechanical transducer. Therefore, it is possible to move the moving body relative to the stationary body in a desired direction.

Although the present invention has been fully described in connection with the preferred embodiments thereof, and modifications to the embodiments, with reference to the accompanying drawings, it is to be noted that other various changes and modifications are also apparent to those skilled in the art.

For example, the electromechanical transducer can be an electrostatic actuator, an electric distortion element (or electrostrictive element), a magnetic distortion element (or magnetostrictive element), or the like.

Also, for example, the "block pulse drive" not only can be applied to the lens drive operation which is executed under the "AF" control or the "PF" control as described above, but also can be used in a wide variety of other applications.

Such changes and modifications are to be understood as included within the scope of the present invention as defined by the appended claims unless they depart therefrom.

What is claimed is:

1. A drive mechanism, comprising:
   an electromechanical transducer;
   a pulse supplier for providing an electrical charge and inducing discharge of the electrical charge relative to the electromechanical transducer, wherein the pulse supplier supplies a drive pulse to the electromechanical transducer so that the electromechanical transducer expands at a first velocity and contracts at a second velocity, and so that a moving body driven by the electromechanical transducer is moved in a predetermined direction; and
   a controller which has a first mode for controlling the pulse supplier, wherein in the first mode the controller controls the pulse supplier so that a pulse supply period, in which a specified number of pulses of the drive pulse are continuously supplied from the pulse supplier to the electromechanical transducer, and a pulse non-supply period, in which the drive pulse is not supplied from the pulse supplier to the electromechanical transducer, are alternately repeated.

2. A drive mechanism as claimed in claim 1, wherein the controller determines a target velocity of the moving body, in which the controller changes the pulse non-supply period, during which the drive pulse is not supplied from the pulse supplier to the electromechanical transducer, on a basis of the target velocity thus determined.

3. A drive mechanism as claimed in claim 1, which further comprises a detector for detecting a movement amount of the moving body,
   wherein the controller changes the specified number of pulses of the drive pulse supplied by the pulse supplier during a pulse supply period, on a basis of the movement amount detected by the detector, so that the movement amount, corresponding to one cycle defined by the pulse supply period and the pulse non-supply period, of the moving body is adjusted to a specified amount.

4. A drive mechanism as claimed in claim 2, wherein the controller changes the specified number of pulses of the drive pulse supplied by the pulse supplier during the pulse supply period on a basis of the target velocity.

5. A drive mechanism as claimed in claim 3, wherein the controller changes the pulse non-supply period, during which the drive pulse is not supplied from the pulse supplier to the electromechanical transducer, on the basis of the movement amount detected by the detector.

6. A drive mechanism as claimed in claim 2, wherein the controller determines the target velocity of the moving body so that the target velocity decreases in steps as the moving body approaches a target stop position.

7. A drive mechanism as claimed in claim 2, wherein the controller makes the target velocity of the moving body correspond to an operation velocity of an operational member.

8. A drive mechanism as claimed in claim 1, wherein the controller further has a second mode for controlling the pulse supplier so that pulses of the drive pulse are continuously supplied from the pulse supplier to the electromechanical transducer, and
wherein the controller selects one of the first mode and the second mode.

9. A drive mechanism as claimed in claim 8, wherein the controller sets a reference velocity based on which mode of the first mode and the second mode the controller has selected, the reference velocity being a reference point at which the controller switches to the other one of the first mode and the second mode.

10. A drive mechanism as claimed in claim 8, wherein the controller determines a target velocity of the moving body, and
wherein the controller selects the second mode when the target velocity is relatively higher, and the controller selects the first mode when the target velocity is relatively lower.

11. An auto-focus photographing lens with a drive mechanism, the drive mechanism comprising:
an electromechanical transducer;
a pulse generator for providing an electrical charge and inducing discharge of the electrical charge relative to the electromechanical transducer, wherein the pulse generator supplies a drive pulse to the electromechanical transducer so that the electromechanical transducer expands at a first velocity and contracts at a second velocity, and so that a moving body driven by the electromechanical transducer is moved in a predetermined direction; and
a controller for controlling the pulse generator so that a pulse supply period, in which a specified number of pulses of the drive pulse are continuously supplied from the pulse generator to the electromechanical transducer, and a pulse non-supply period, in which the drive pulse is not supplied from the pulse generator to the electromechanical transducer, are alternately repeated,
wherein the moving body moves a focus lens.

12. A power-focus photographing lens with a drive mechanism, the drive mechanism comprising:
an electromechanical transducer;
a pulse supplier for providing an electrical charge and inducing discharge of the electrical charge relative to the electromechanical transducer, wherein the pulse supplier supplies a drive pulse to the electromechanical transducer so that the electromechanical transducer expands at a first velocity and contracts at a second velocity, and so that a moving body driven by the electromechanical transducer is moved in a predetermined direction; and
a controller for controlling the pulse supplier so that a pulse supply period, in which a specified number of pulses of the drive pulse are continuously supplied from the pulse supplier to the electromechanical transducer, and a pulse non-supply period, in which the drive pulse is not supplied from the pulse supplier to the electromechanical transducer, are alternately repeated,
wherein the controller determines a target velocity of the moving body, in which the controller changes the pulse non-supply time, during which the drive pulse is not supplied from the pulse supplier to the electromechanical transducer, on a basis of the target velocity thus determined,
wherein the controller makes the target velocity of the moving body correspond to an operation velocity of an operational member,
wherein the moving body moves a focus lens, and
wherein the operational member is a member for adjusting a focus of the focus lens.

13. A drive mechanism having a drive circuit, the drive mechanism comprising:
an electromechanical transducer; and
a pulse supply section for providing an electrical charge and inducing discharge of the electrical charge relative to the electromechanical transducer, wherein the pulse supply section supplies a drive pulse to the electromechanical transducer so that the electromechanical transducer expands at a first velocity and contracts at a second velocity, and so that a moving body driven by the electromechanical transducer is moved in a predetermined direction,
wherein the drive circuit has a control section for controlling the pulse supply section so that a pulse supply period, in which a specified number of pulses of the drive pulse are continuously supplied from the pulse supply section to the electromechanical transducer, and a pulse non-supply period, in which the drive pulse is not supplied from the pulse supply section to the electromechanical-transducer, are alternately repeated.

14. An auto-focus photographing lens with a drive mechanism, the drive mechanism comprising:
an electromechanical transducer;
a pulse supplier for providing an electrical charge and inducing discharge of the electrical charge relative to the electromechanical transducer, wherein the pulse supplier supplies a drive pulse to the electromechanical transducer so that the electromechanical transducer expands at a first velocity and contracts at a second velocity, and so that a moving body driven by the electromechanical transducer is moved in a predetermined direction; and
a controller which has a first mode for controlling the pulse supplier so that a pulse supply period, in which a specified number of pulses of the drive pulse are continuously supplied from the pulse supplier to the electromechanical transducer, and a pulse non-supply period, in which the drive pulse is not supplied from the pulse supplier to the electromechanical transducer, are alternately repeated, wherein the controller further has a second mode for controlling the pulse supplier so that pulses of the drive pulse are continuously supplied from the pulse supplier to the electromechanical transducer, wherein the controller selects one of the first mode and the second mode, and wherein the moving body moves a focus lens.

15. A power-focus photographing lens with a drive mechanism, the drive mechanism comprising:

an electromechanical transducer;

a pulse supplier for providing an electrical charge and inducing discharge of the electrical charge relative to the electromechanical transducer, wherein the pulse supplier supplies a drive pulse to the electromechanical transducer so that the electromechanical transducer expands at a first velocity and contracts at a second velocity, and so that a moving body driven by the electromechanical transducer is moved in a predetermined direction; and a controller which has a first mode for controlling the pulse supplier so that a pulse supply period, in which a specified number of pulses of the drive pulse are continuously supplied from the pulse supplier to the electromechanical transducer, and a pulse non-supply period, in which the drive pulse is not supplied from the pulse supplier to the electromechanical transducer, are alternately repeated, wherein the controller further has a second mode for controlling the pulse supplier so that pulses of the drive pulse are continuously supplied from the pulse supplier to the electromechanical transducer, wherein the controller selects one of the first mode and the second mode, and wherein the moving body drives a focus lens in which a movement of the moving body corresponds to a movement of an operational member.

16. A drive mechanism having a drive circuit, the drive mechanism comprising:

an electromechanical transducer; and a pulse supply section for providing an electrical charge and inducing discharge of the electrical charge relative to the electromechanical transducer, wherein the pulse supply section supplies a drive pulse to the electromechanical transducer so that the electromechanical transducer expands at a first velocity and contracts at a second velocity, and so that a moving body driven by the electromechanical transducer is moved in a predetermined direction, wherein the drive circuit comprises a control section which has a first mode for controlling the pulse supply section so that a pulse supply period, in which a specified number of pulses of the drive pulse are continuously supplied from the pulse supply section to the electromechanical transducer, and a pulse non-supply period, in which the drive pulse is not supplied from the pulse supply section to the electromechanical transducer, are alternately repeated, wherein the control section further has a second mode for controlling the pulse supply section so that pulses of the drive pulse are continuously supplied from the pulse supply section to the electromechanical transducer, and wherein the control section selects one of the first mode and the second mode.

* * * * *